US012726390B2

(12) United States Patent
Jeon et al.

(10) Patent No.: US 12,726,390 B2
(45) Date of Patent: Sep. 1, 2026

(54) TRANSMISSION AND RECEPTION WITHOUT PRECISE TIMING CAPABILITY

(71) Applicant: Samsung Electronics Co., Ltd., Suwon-si (KR)

(72) Inventors: Jeongho Jeon, San Jose, CA (US); Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 19/012,794

(22) Filed: Jan. 7, 2025

(65) Prior Publication Data

US 2025/0240193 A1 Jul. 24, 2025

Related U.S. Application Data

(60) Provisional application No. 63/553,519, filed on Feb. 14, 2024, provisional application No. 63/623,028, filed on Jan. 19, 2024.

(51) Int. Cl.
*H04L 27/20* (2006.01)
*H04W 56/00* (2009.01)

(52) U.S. Cl.
CPC ....... *H04L 27/2003* (2013.01); *H04W 56/001* (2013.01)

(58) Field of Classification Search
CPC ......................... H04W 56/001; H04L 27/2003
USPC .......................................................... 375/308
See application file for complete search history.

(56) References Cited

U.S. PATENT DOCUMENTS

| | | | | |
|---|---|---|---|---|
| 9,768,923 | B2 | 9/2017 | Yang et al. | |
| 2011/0181397 | A1* | 7/2011 | Kang | G06K 19/0723 340/10.2 |
| 2018/0375703 | A1 | 12/2018 | Kellogg et al. | |
| 2020/0236524 | A1 | 7/2020 | Ye et al. | |

OTHER PUBLICATIONS

"5G; NR; Physical channels and modulation (3GPP TS 38.211 version 17.5.0 Release 17)", ETSI TS 138 211 V17.5.0, Jul. 2023, 141 pages.

"3rd Generation Partnership Project; Technical Specification Group Radio Access Network; NR; Multiplexing and channel coding (Release 17)", 3GPP TS 38.212 V17.5.0, Mar. 2023, 203 pages.

(Continued)

*Primary Examiner* — Leila Malek

(57) ABSTRACT

Apparatuses and methods for transmission and reception without precise timing capability. A method for an Internet of Things (IoT) device to communicate with a reader includes receiving a physical reader-to-device channel (PRDCH) from the reader and determining a transmission timing of a physical device-to-reader channel (PDRCH) to the reader. Transmission of the PDRCH is triggered by reception of the PRDCH. The transmission timing of the PDRCH is determined based on a reception timing of the PRDCH or another PRDCH. The method further includes transmitting the PDRCH to the reader at the determined transmission timing. The PDRCH is On-Off Keying (OOK) or Phase-Shift Keying (PSK) modulated by backscattering an externally provided carrier wave (CW) or generating the CW internally.

20 Claims, 19 Drawing Sheets

(56) References Cited

OTHER PUBLICATIONS

"5G; NR; Physical layer procedures for control (3GPP TS 38.213 version 17.6.0 Release 17)", ETSI TS 138 213 V17.6.0, Jul. 2023, 265 pages.
"5G; NR; Physical layer procedures for data (3GPP TS 38.214 version 17.6.0 Release 17)", ETSI TS 138 214 V17.6.0, Jul. 2023, 236 pages.
"5G; NR; Radio Resource Control (RRC); Protocol specification (3GPP TS 38.331 version 17.5.0 Release 17)", ETSI TS 138 331 V17.5.0, Jul. 2023, 1304 pages.
"5G; NR; Medium Access Control (MAC) protocol specification (3GPP TS 38.321 version 17.5.0 Release 17)", ETSI TS 138 321 V17.5.0, Jul. 2023, 255 pages.
International Search Report and Written Opinion issued May 13, 2025 regarding International Application No. PCT/KR2025/000887, 7 pages.
CATT, "Timing relationship enhancement for NB-IoT/eMTC", 3GPP TSG RAN WG1 #105-e, R1-2104505, May 2021, 5 pages.

* cited by examiner

TRANSMISSION AND RECEPTION WITHOUT PRECISE TIMING CAPABILITY

CROSS-REFERENCE TO RELATED AND CLAIM OF PRIORITY

The present application claims priority under 35 U.S.C. § 119(e) to U.S. Provisional Patent Application No. 63/623,028 filed on Jan. 19, 2024 and U.S. Provisional Patent Application No. 63/553,519 filed on Feb. 14, 2024, which are hereby incorporated by reference in their entirety.

TECHNICAL FIELD

The present disclosure relates generally to wireless communication systems and, more specifically, the present disclosure is related to apparatuses and methods for transmission and reception without precise timing capability.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to transmission and reception without precise timing capability.

In one embodiment, a method for an Internet of Things (IoT) device to communicate with a reader is provided. The reader is a base station or a user equipment (UE). The method includes receiving a physical reader-to-device channel (PRDCH) from the reader and determining a transmission timing of a physical device-to-reader channel (PDRCH) to the reader. Transmission of the PDRCH is triggered by reception of the PRDCH. The transmission timing of the PDRCH is determined based on a reception timing of the PRDCH or another PRDCH. The method further includes transmitting the PDRCH to the reader at the determined transmission timing. The PDRCH is On-Off Keying (OOK) or Phase-Shift Keying (PSK) modulated by backscattering an externally provided carrier wave (CW) or generating the CW internally.

In another embodiment, an IoT device is provided. The IoT device includes a transceiver configured to receive a PRDCH from a reader and processing circuitry configured to determine a transmission timing of a PDRCH to the reader. The reader is a base station or a UE. Transmission of the PDRCH is triggered by reception of the PRDCH. The transmission timing of the PDRCH is determined based on a reception timing of the PRDCH or another PRDCH. The transceiver is further configured to transmit the PDRCH to the reader at the determined transmission timing. The PDRCH is OOK or PSK modulated by backscattering an externally provided CW or generating the CW internally.

In yet another embodiment, a reader is provided. The reader includes a transceiver configured to transmit a PRDCH to an IoT device and receive a PDRCH from the IoT device. The reader is a base station or a UE. The PDRCH is OOK or PSK modulated by backscattering of an externally provided CW or internal generation of the CW. The PDRCH is triggered by transmission of the PRDCH. A transmission timing of the PDRCH is based on a reception timing of the PRDCH or another PRDCH.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-19, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein: [1] 3GPP TS 38.211 v17.5.0, "NR; Physical channels and modulation;" [2] 3GPP TS 38.212 v17.5.0, "NR; Multiplexing and channel coding;" [3] 3GPP TS 38.213 v17.6.0, "NR; Physical layer procedures for control;" [4] 3GPP TS 38.214 v17.6.0, "NR; Physical layer procedures for data;" [5] 3GPP TS 38.331 v17.5.0, "NR; Radio Resource Control (RRC) protocol specification;" and [6] 3GPP TS 38.321 v17.5.0, "NR; Medium Access Control (MAC) protocol specification."

Figure 1:
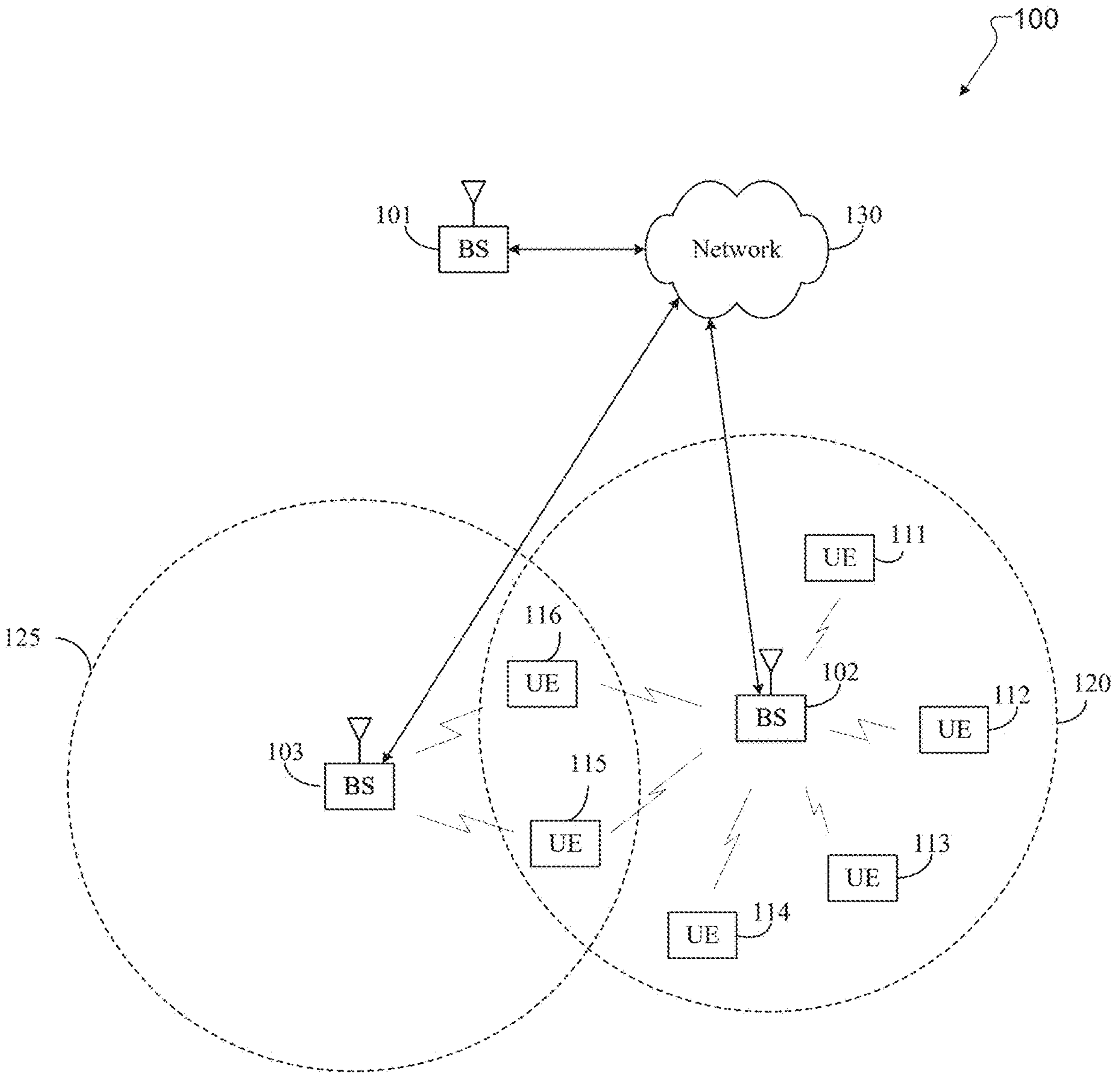
FIG. 1 illustrates an example wireless network according to embodiments of the present disclosure.
Figure 2:
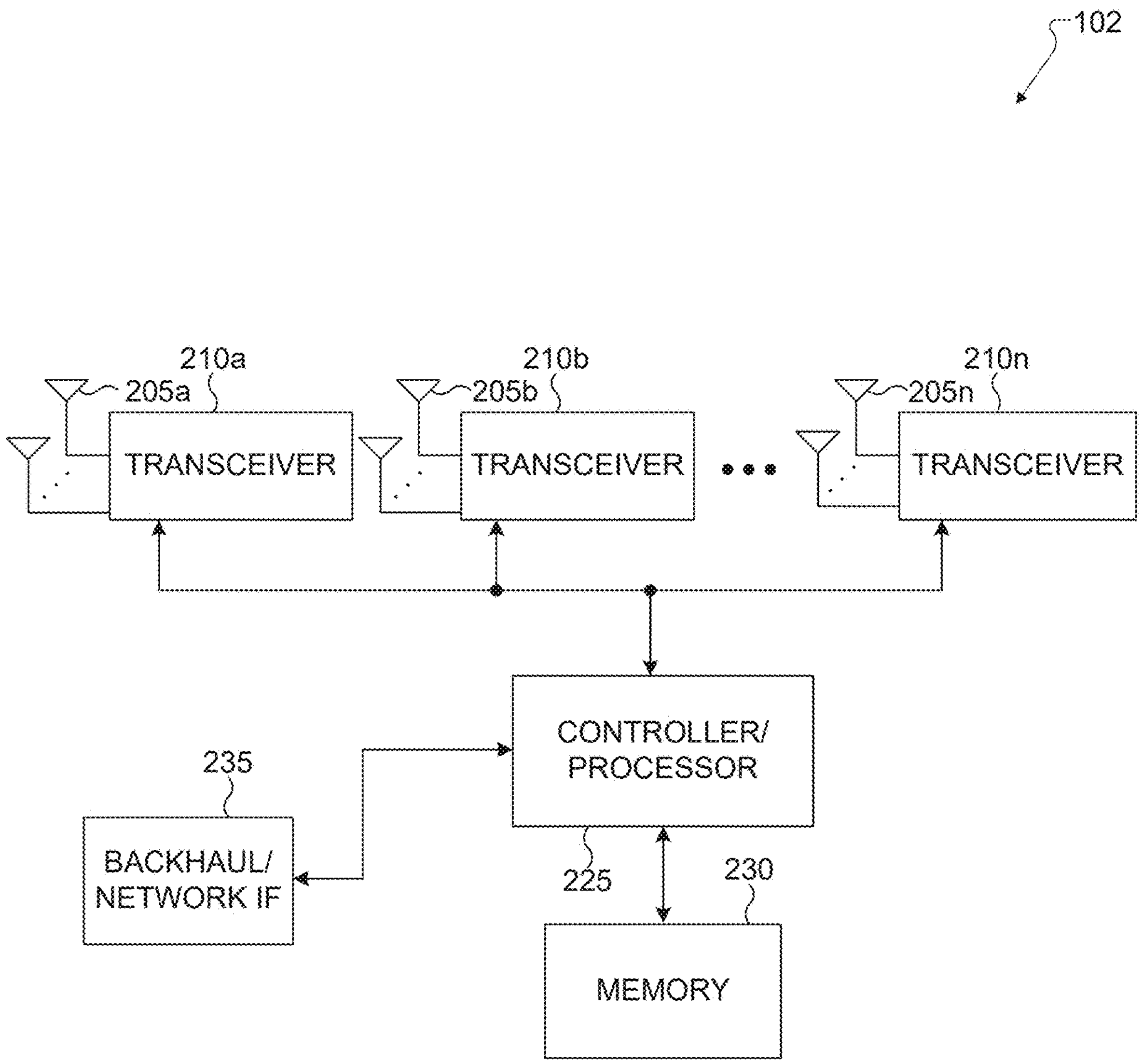
FIG. 2 illustrates an example gNodeB (gNB) according to embodiments of the present disclosure.
Figure 3:
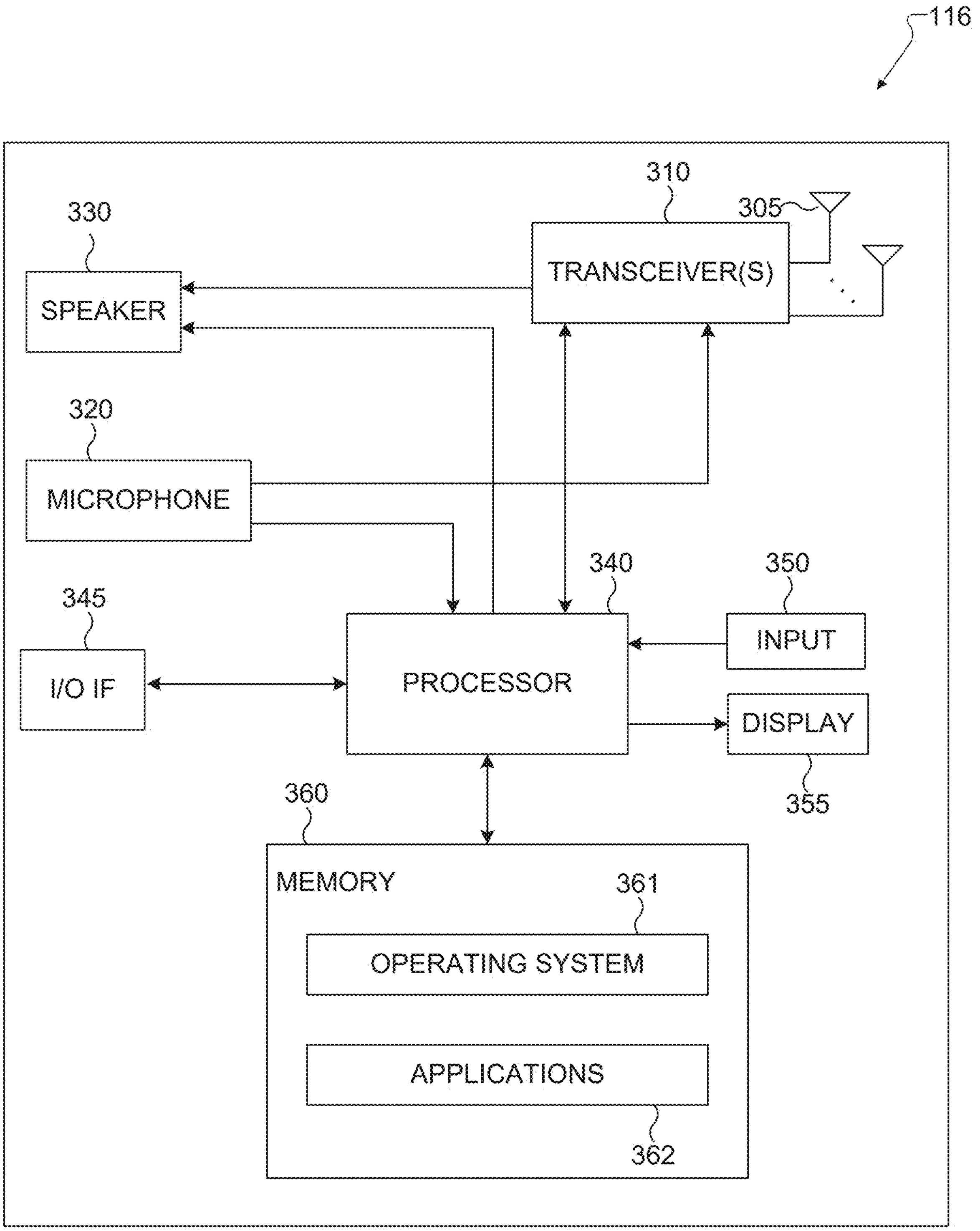
FIG. 3 illustrates an example UE according to embodiments of the present disclosure.

FIGS. 1-3 below describe various embodiments implemented in wireless communications systems and with the use of orthogonal frequency-division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting transmission and reception without precise timing capability. In certain embodiments, one or more of the gNBs 101-103 include circuitry, programing, or a combination thereof to provide for transmission and reception without precise timing capability.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-convert the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as providing for transmission and reception without precise timing capability. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The backhaul or network interface 235 could support communications over any suitable wired or wireless connection(s). For example, when the gNB 102 is implemented as part of a cellular communication system (such as one supporting 5G/NR, LTE, or LTE-A), the backhaul or network interface 235 could allow the gNB 102 to communicate with other gNBs over a wired or wireless backhaul connection. When the gNB 102 is implemented as an access point, the backhaul or network interface 235 could allow the gNB 102 to communicate over a wired or wireless local area network or over a wired or wireless connection to a larger network (such as the Internet). The backhaul or network interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes to utilize and/or support transmission and reception without precise timing capability as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
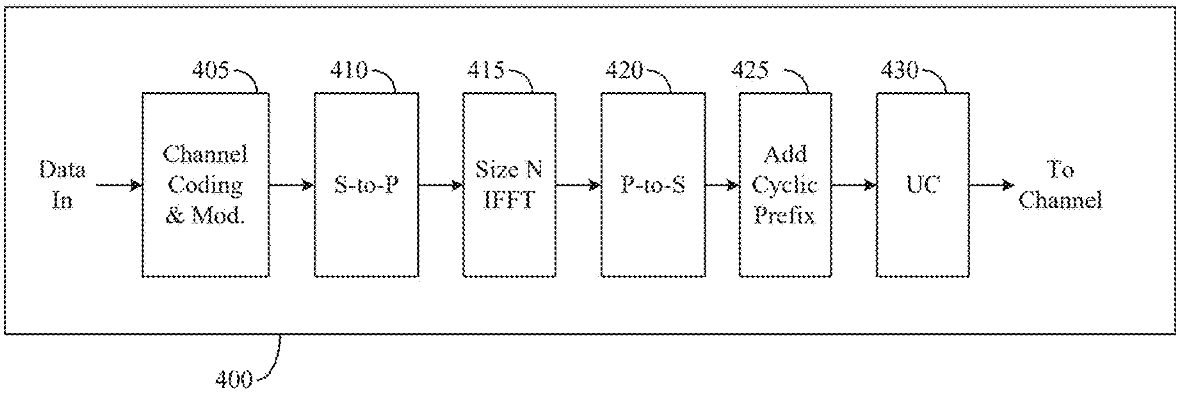
FIGS. 4A and 4B illustrate an example of a wireless transmit and receive paths according to embodiments of the present disclosure.
Figure 4B:
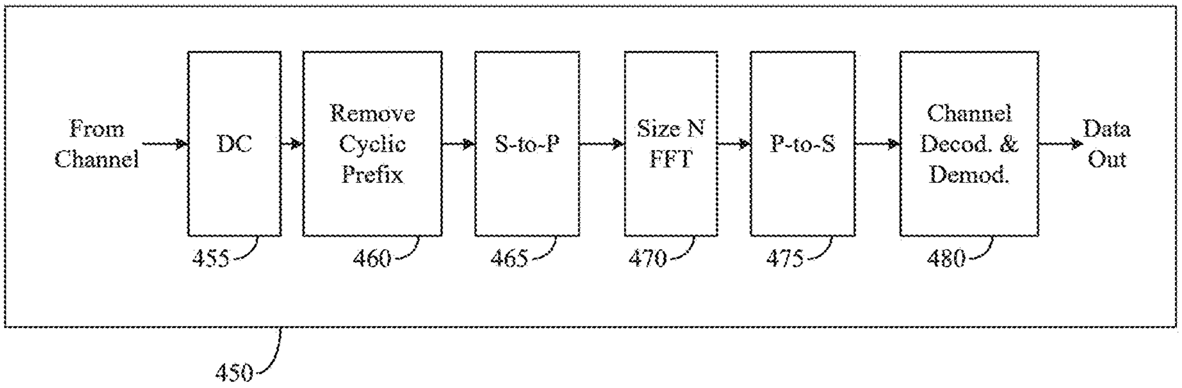

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 and/or receive path 450 perform or utilize transmission and reception without precise timing capability as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Internet of things (IoT) devices include ambient-power-enabled IoT (A-IoT) devices, which are ultra-low-complexity devices with very small form factor and low-cost design that operate without a common battery that can be manually replaced or recharged. Instead, A-IoT devices can be battery-less or with a small battery (such as a small capacitor) that operate based on energy harvesting from RF waveforms or other ambient energy sources. Regarding the limited size and complexity required by practical applications for battery-less devices with no energy storage capability or devices with limited energy storage that do not need to be replaced or recharged manually, the output power of energy harvester is typically from 1 μW to a few hundreds of μW.

In various embodiments throughout the disclosure, a UE or a device may be referred to as an A-IoT device or an A-IoT UE based on energy harvesting with ultra-low complexity and power consumption and for low-end IoT applications. For example, the UE may have limited (or no) energy storage or battery capability (e.g., a capacitor), such as an energy storage unit for amplification of receptions at the UE or transmission by the UE, or for other UE operations, such as power-on, warm-up, memory, internal processing, and so on, or operating with backscattering communication.

An A-IoT device can be an IoT device that satisfies one or more of the following (or variations thereof):

- powered by energy harvesting, being either battery-less or with limited energy storage capability (e.g., using a capacitor) and the energy is provided through the harvesting of radio waves (including RF waveforms), light (including solar light or indoor light), motion, pressure, heat, or any other power source that could be seen suitable;
- with low complexity, small size and lower capabilities and lower power consumption than previously defined 3GPP IoT devices (e.g., NB-IoT/enhanced machine type communication (eMTC) devices);
- maintenance free and can have long life span (e.g., more than 10 years).

An A-IoT may directly communicate with a base station/gNB (e.g., operating as a reader), or may indirectly communicate with a base station/gNB through an intermediate/assisting node, such as a handheld device/UE (for example, a "reader" UE that scans the A-IoT devices), a relay, integrated access and backhaul (IAB) node, a repeater for example a network-controlled repeater (NCR), and so on. The communication can be mono-static wherein the transmitter node to the A-IoT UE is same as the receiving node from the A-IoT UE, or can be bi-static (or multi-static) wherein the transmitter nodes to the A-IoT UE can be different from the receiving nodes from the A-IoT UE.

In various embodiments, the A-IoT device operates with energy storage and power management capability. These devices are characterized by ultra-low power consumption and they employ energy harvesting mechanisms such as solar, RF energy and kinetic energy and thus don't require battery replacement or swapping frequently. In various embodiments, an A-IoT device operates with energy harvesting (EH) or with limited (or no) energy storage/battery capability (such as a capacitor), such as an energy storage unit for amplification of receptions at the UE or transmission by the UE, or for other UE operations, such as power-on, warm-up, memory, internal processing, and so on, or operating with backscattering communication.

In various embodiments, the A-IoT device operates with RF envelope detection for receiving amplitude shift keying (ASK), e.g., OOK, modulated signal. RF envelope detection is a key function that enables the Ambient IoT devices to filter and analyze RF signals. This technique is applied in the reception of modulated RF signals with a view of acquiring information from the signals and hence enable communication between devices with efficiency and with minimum power consumption. RF envelope detection is one of the most important techniques that are used in many of the low power consumption wireless communication protocols that are employed in Ambient IoT systems.

In various embodiments, the A-IoT device may operate with impedance matching. Impedance matching may be utilized in passive Ambient IoT devices backscattering externally provisioned CW signal.

For precise synchronization, the SFO requirement to NR is within ±0.1 parts per million (PPM). In comparison, taking RFID as a reference, SFO for A-IoT may be ±10-20 PPM. Given the low complexity and the low power consumption requirements for A-IoT devices, it is apparent that the oscillators equipped with A-IoT devices will be significantly subpar to that equipped with a normal NR UE. It is therefore impractical to expect a precise timing capability for A-IoT devices as it is usually expected for normal NR UEs. Furthermore, given that A-IoT devices are powered by harvesting energy, the device maybe running out of power time to time and, thereby, loosing timing, i.e., lacking timing maintaining capability.

Therefore, embodiments of the present disclosure recognize that there is a need to define procedures and methods for A-IoT devices to transmit and receive in a lack of precise synchronization capability or a lack of maintaining timing indexes, such as frame, slot, or symbol indexes.

Also, embodiments of the present disclosure further recognize that there is another need to define PRDCH/PDRCH signal structure that can be used for a communication system wherein A-IoT devices are lacking precise synchronization capability or a lack of maintaining timing indexes.

The disclosure relates to a communication system. The disclosure relates to defining functionalities and procedures for communication with A-IoT devices which may be lacking a precise timing capability and may operate in a passive or active communication mode.

The disclosure relates to defining functionalities and procedures for A-IoT devices to transmit and receive following network triggering in an asynchronous manner with relative timing.

The disclosure further relates to defining functionalities and procedures for A-IoT devices to transmit and receive in a locally synchronous manner following the timing reference signal from the network (e.g., the network 130) without maintaining frame synchronization.

The disclosure also relates to defining basic DL/UL signal structure for A-IoT transmission and reception. DL and UL are also referred to as reader-to-device (R2D) and device-to-reader (D2R), respectively, and vice versa.

Various embodiments of the disclosure for communication with A-IoT devices, which may be lacking a precise timing capability and may operate in a passive communication mode, are summarized in the following and are fully elaborated further below.

- Method and apparatus for defining functionalities and procedures for A-IoT devices to transmit and receive following network triggering in an asynchronous manner with relative timing.
- Method and apparatus for defining functionalities and procedures for A-IoT devices to transmit and receive in a locally synchronous manner following the timing reference signal from the reader without maintaining frame synchronization.
- Method and apparatus for defining basic R2D/D2R signal structure for A-IoT transmission and reception.

It is envisaged that the number of connected devices will reach ~500 billion by 2030, which is about ~59 times larger than the expected world population (~8.5 billion) by that time. Mobile devices will take various form-factors, such as augmented reality (AR) glasses, virtual reality (VR) headsets, hologram devices, while a large portion of the devices will be Internet-of-Things (IoT) devices for improving productivity efficiency and increasing comforts of life. As the number of IoT devices grows exponentially, those IoT devices will become dominant in the next generation wireless communication systems such as fifth generation (5G) advanced, sixth generation (6G) systems, and so on.

With the explosive number of IoT devices, it may be challenging to power the IoT devices by battery that needs to be replaced or recharged manually, which leads to high maintenance cost. The automation and digitalization of various industries demand new IoT technologies of supporting batteryless devices with no energy storage capability or devices with energy storage that does not need to be replaced or recharged manually. Such types of devices are collectively termed as ambient IoT (A-IoT) in this disclosure, which is powered by various renewable energy sources such as radio waves, light, motion, or heat, etc. Use cases of A-IoT devices include asset inventory/tracking and remote environmental monitoring. The following list provides example use cases of A-IoT devices:

- Indoor inventory
  - Automated warehousing
  - Medical instruments inventory management and positioning
  - Non-Public Network for logistics
  - Automobile manufacturing
  - Airport terminal/shipping port
  - Smart laundry
  - Automated supply chain distribution
  - Fresh food supply chain
  - End-to-end logistics
  - Flower auction
  - Electronic shelf label
- Indoor sensor
  - Smart homes
  - Base station machine room environmental supervision
  - Smart laundry
  - Smart agriculture
  - Smart pig farm
  - Cow stable
- Indoor positioning
  - Finding Remote Lost Item
  - Location service
  - Ranging in a home
  - Personal belongings finding
  - Positioning in shopping center
  - Museum Guide
- Indoor command
  - Online modification of medical instruments status
  - Device activation and deactivation
  - Elderly Health Care
  - Device Permanent Deactivation
  - Electronic shelf label

- Outdoor inventory
  - Medical instruments inventory management and positioning
  - Non-public network for logistics
  - Airport terminal/shipping port
  - Automated supply chain distribution
- Outdoor sensor
  - Smart grids
  - Forest Fire Monitoring
  - Dairy farming
  - Smart manhole cover safety monitoring
  - Smart bridge health monitoring
- Outdoor positioning
  - Finding remote lost item
  - Location service
  - Personal belongings finding
- Outdoor command
  - Online modification of medical instruments status
  - Device activation and deactivation
  - Elderly Health Care
  - Controller in smart agriculture Taking into account the limited size and low complexity required by practical applications of A-IoT devices, the output power of energy harvesting from ambient power sources is typically from 1 μW to a few hundreds of μW, which is orders of magnitude lower than normal UE having peak power consumption higher than 10 mW. This requires a new wireless access technology for A-IoT devices, which cannot be fulfilled by existing cellular systems including low-power IoT technologies such as NB-IoT and enhanced machine type communication (eMTC).

In the following, an italicized name for a parameter implies that the parameter is provided by higher layers.

R2D transmissions (e.g., PRDCH transmissions) or D2R transmissions (e.g., PDRCH transmissions) can be based on an OFDM waveform including a variant using DFT precoding that is known as DFT-spread-OFDM that is typically applicable to NR UL transmissions.

In the following, subframe (SF) refers to a transmission time unit for the LTE RAT and slot refers to a transmission time unit for an NR RAT. For example, the slot duration can be a sub-multiple of the SF duration. NR can use a different DL or UL slot structure than an LTE SF structure. Differences can include a structure for transmitting physical downlink control channels (PDCCHs), locations and structure of demodulation reference signals (DM-RS), transmission duration, and so on. Further, eNB refers to a base station serving UEs operating with LTE RAT and gNB refers to a base station serving UEs operating with NR RAT. Exemplary embodiments evaluate a same numerology, that includes a sub-carrier spacing (SCS) configuration and a cyclic prefix (CP) length for an OFDM symbol, for transmission with LTE RAT and with NR RAT. In such case, OFDM symbols for the LTE RAT as same as for the NR RAT, a subframe is same as a slot and, for brevity, the term slot is subsequently used in the remaining of the disclosure.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^{\mu}\cdot 15$ kHz. A unit of one sub-carrier over one symbol is referred to as resource element (RE). A unit of one RB over one symbol is referred to as physical RB (PRB).

DL signaling include PDSCHs conveying information content, PDCCHs conveying DL control information (DCI), and reference signals (RS). A PDCCH can be transmitted over a variable number of slot symbols including one slot symbol and over a number of control channel elements (CCEs) from a predetermined set of numbers of CCEs referred to as CCE aggregation level within a control resource set (CORESET) as described in 3GPP TS 36.211 [REF1] v17.6.0, "NR; Physical channels and modulation", and 3GPP TS 38.213 [REF3] v17.6.0 "NR; Physical Layer procedures for control".

Figure 5:
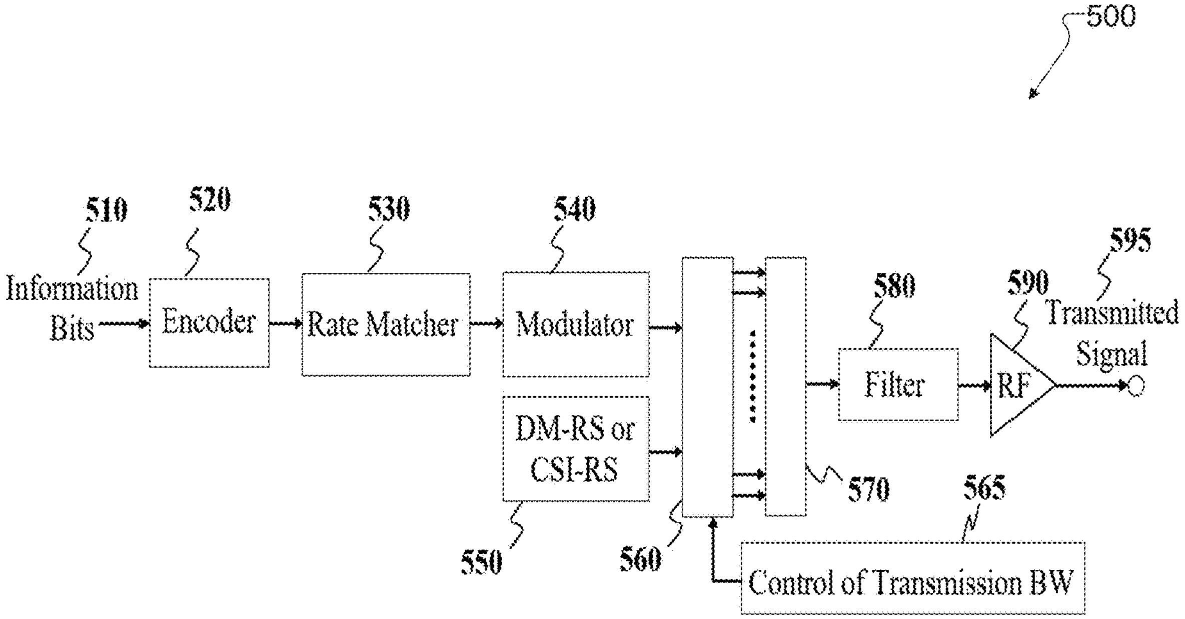
FIG. 5 illustrates an example of a transmitter structure using orthogonal frequency-division multiplexing (OFDM) according to embodiments of the present disclosure.

FIG. 5 illustrates an example of a transmitter structure 500 using OFDM according to embodiments of the present disclosure. For example, transmitter structure 500 using OFDM can be implemented in gNB 102 of FIG. 1. This example is for illustration only and other embodiments can be used without departing from the scope of the present disclosure.

Information bits, such as DCI bits or data bits 510, are encoded by encoder 520, rate matched to assigned time/frequency resources by rate matcher 530, and modulated by modulator 540. Subsequently, modulated encoded symbols and DM-RS or channel state information reference signal (CSI-RS) 550 are mapped to REs 560, an inverse fast Fourier transform (IFFT) is performed by filter 570. A BW selector unit 565, a filter 580, a radio frequency (RF) amplifier 590, and transmitted signal 595 are also included.

Figure 6:
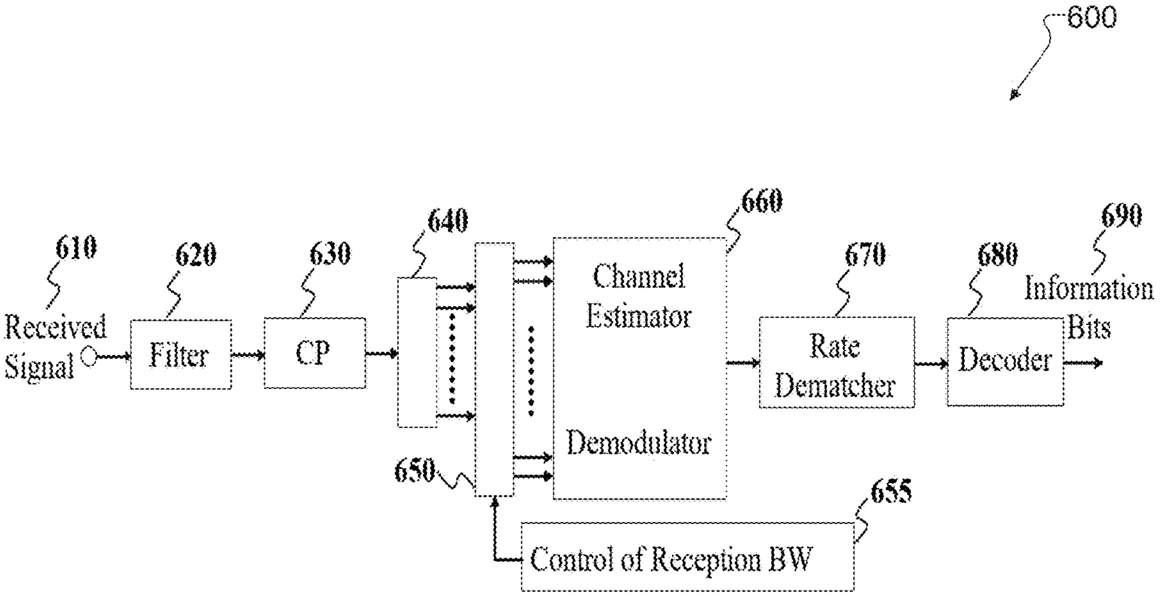
FIG. 6 illustrates an example of a receiver structure using OFDM according to embodiments of the present disclosure.

FIG. 6 illustrates an example of a receiver structure 600 using OFDM according to embodiments of the present disclosure. For example, receiver structure 600 using OFDM can be implemented by any of the UEs 111-116 of FIG. 1. This example is for illustration only and other embodiments can be used without departing from the scope of the present disclosure.

A received signal 610 is filtered by filter 620, a CP removal unit removes a CP 630, a filter 640 applies a fast Fourier transform (FFT), RE de-mapping unit 650 de-maps REs selected by BW selector unit 655, received symbols are demodulated by a channel estimator and a demodulator unit 660, a rate de-matcher 670 restores a rate matching, and a decoder 680 decodes the resulting bits to provide information bits 690.

With reference to FIG. 5, an example transmitter structure using OFDM according to this disclosure is shown.

With reference to FIG. 6, an example receiver structure using OFDM according to this disclosure is shown.

Figure 7:
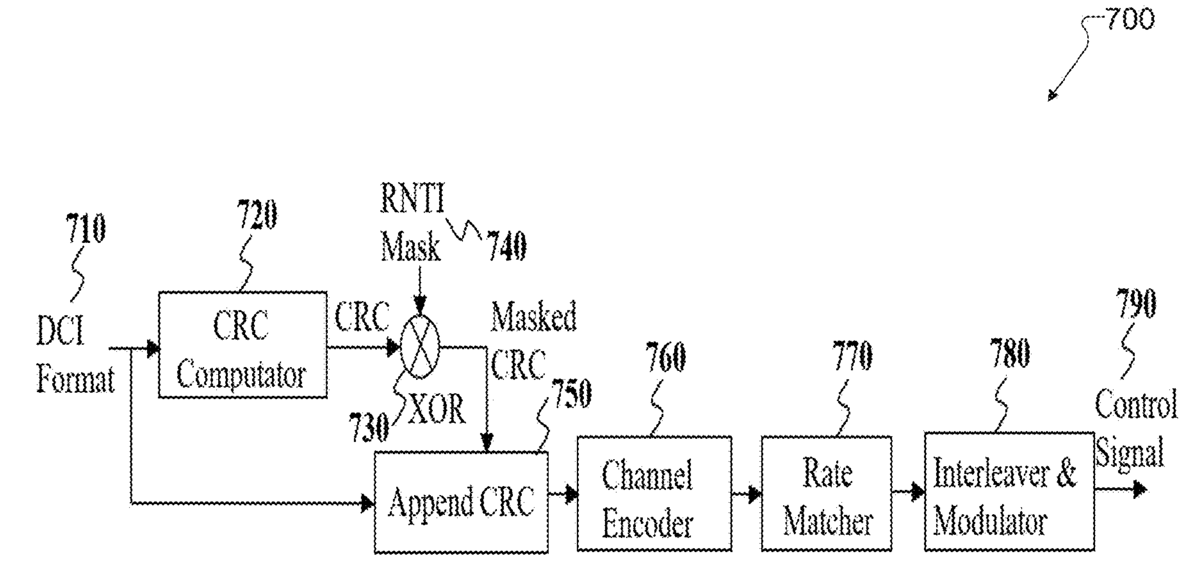
FIG. 7 illustrates an example encoding structure for a downlink control information (DCI) format according to embodiments of the present disclosure.

FIG. 7 illustrates an example encoding structure 700 for a downlink control information (DCI) format according to embodiments of the present disclosure. For example, can be implemented in gNB 102 of FIG. 1. This example is for illustration only and other embodiments can be used without departing from the scope of the present disclosure.

A gNB (e.g., the BS 102) separately encodes and transmits each DCI format in a respective PDCCH. When applicable, a radio network temporary identifier (RNTI) for a UE (e.g., the UE 116) that a DCI format is intended for masks a cyclic redundancy check (CRC) of the DCI format codeword in order to enable the UE to identify the DCI format. For example, the CRC can include 24 bits and the RNTI can include 16 bits or 24 bits. The CRC of (non-coded) DCI format bits 710 is determined using a CRC computation unit 720, and the CRC is masked using an exclusive OR (XOR) operation unit 730 between CRC bits and RNTI bits 740. The XOR operation is defined as XOR (0,0)=0, XOR (0,1)=1, XOR (1,0)=1, XOR (1,1)=0. The masked CRC bits are appended to DCI format information bits using a CRC append unit 750. An encoder 760 performs channel coding, such as polar coding, followed by rate matching to allocated resources by rate matcher 770. Interleaving and modulation units 780 apply interleaving and modulation, such as QPSK, and the output control signal 790 is transmitted.

Figure 8:
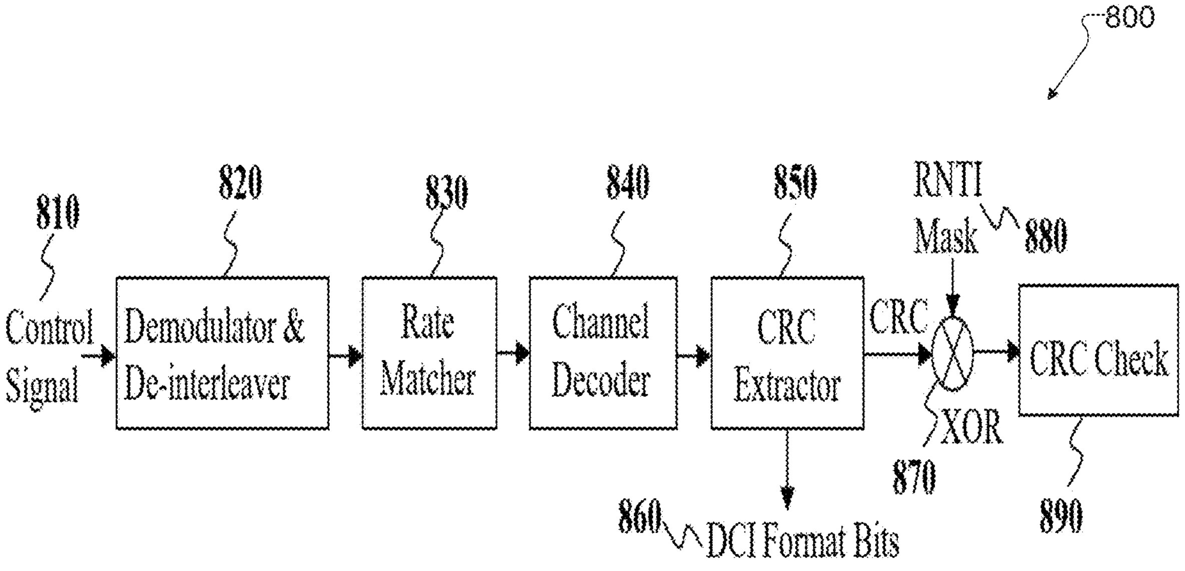
FIG. 8 illustrates an example decoding structure for a DCI format according to embodiments of the present disclosure.

FIG. 8 illustrates an example decoding structure 800 for a DCI format according to embodiments of the present disclosure. For example, decoding structure 800 for a DCI format can be implemented by any of the UEs 111-116 of FIG. 1. This example is for illustration only and other embodiments can be used without departing from the scope of the present disclosure.

A received control signal 810 is demodulated and de-interleaved by a demodulator and a de-interleaver 820. A rate matching applied at a gNB transmitter is restored by rate matcher 830, and resulting bits are decoded by decoder 840. After decoding, a CRC extractor 850 extracts CRC bits and provides DCI format information bits 860. The DCI format information bits are de-masked 870 by an XOR operation with a RNTI 880 (when applicable) and a CRC check is performed by unit 890. When the CRC check succeeds (check-sum is zero), the DCI format information bits are regarded to be valid. When the CRC check does not succeed, the DCI format information bits are regarded to be invalid.

DCI can serve several purposes. A DCI format includes a number of fields, or information elements (IEs), and is typically used for scheduling a PDSCH (DL DCI format) or a PUSCH (UL DCI format) transmission. A DCI format includes cyclic redundancy check (CRC) bits in order for a UE to confirm a correct detection. A DCI format type is identified by a radio network temporary identifier (RNTI) that scrambles the CRC bits. For a DCI format scheduling a PDSCH or a PUSCH for a single UE with RRC connection to a gNB, the RNTI is a cell RNTI (C-RNTI) or another RNTI type such as a modulation and coding scheme-cell radio network temporary identifier (MCS-C-RNTI) For a DCI format scheduling a PDSCH conveying system information (SI) to a group of UEs, the RNTI is a SI-RNTI. For a DCI format scheduling a PDSCH providing a response to a random access (RA) from a group of UEs, the RNTI is a RA-RNTI. For a DCI format scheduling a PDSCH providing contention resolution in Msg4 of a RA process, the RNTI is a temporary C-RNTI (TC-RNTI). For a DCI format scheduling a PDSCH paging a group of UEs, the RNTI is a paging RNTI (P-RNTI). For a DCI format providing transmission power control (TPC) commands to a group of UEs, the RNTI is a TPC-RNTI, and so on. Each RNTI type is configured to a UE through higher layer signaling. A UE typically decodes at multiple candidate locations for PDCCH receptions as determined by an associated search space set.

With reference to FIG. 7, an example encoding process for a DCI format according to this disclosure is shown.

With reference to FIG. 8 an example decoding process for a DCI format for use with a UE according to this disclosure is shown.

For each DL bandwidth part (BWP) indicated to a UE in a serving cell, the UE can be provided by higher layer signaling with P≤3 control resource sets (CORESETs). For each CORESET, the UE is provided a CORESET index p, 0≤p<12, a DM-RS scrambling sequence initialization value, a precoder granularity for a number of resource element groups (REGs) in the frequency domain where the UE can expect use of a same DM-RS precoder, a number of consecutive symbols for the CORESET, a set of resource blocks (RBs) for the CORESET, control channel element to resource element group (CCE-to-REG) mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field for DCI format 1_1 transmitted by a PDCCH in CORESET p.

For each DL BWP configured to a UE in a serving cell, the UE is provided by higher layers with S≤10 search space sets. For each search space set from the S search space sets, the UE is provided a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s<k_s$ slots indicating a number of slots that the search space set s exists, a number of PDCCH candidates $$M_s^{(L)}$$

per CCE aggregation level L, and an indication that search space set s is either a common search space (CSS) set or a UE-specific search space (USS) set. When search space set s is a CSS set, the UE monitors PDCCH for detection of DCI format 2_x, where x ranges from 0 to 7 as described in TS 38.212 [REF2] v17.6.0, or for DCI formats associated with scheduling broadcast/multicast PDSCH receptions, and for DCI format 0_0 and DCI format 1_0.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.$$

The UE monitors PDCCH candidates for search space set s for $T_s$ consecutive slots, starting from slot $$n_{s,f}^{\mu},$$

and does not monitor PDCCH candidates for search space set s for the next $k_s-T_s$ consecutive slots. The UE determines CCEs for monitoring PDCCH according to a search space set based on a search space equation as described in TS 38.213 [REF3] v17.6.0.

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving/scheduled cell based on a number of PDCCH candidates in respective search space sets for the corresponding active DL BWP. In the following, for brevity, that constraint for the number of DCI format sizes will be referred to as DCI size limit. When the DCI size limit would be exceeded for a UE based on a configuration of DCI formats that the UE monitors PDCCH, the UE aligns the size of some DCI formats, as described in TS 38.212 [REF2] v17.6.0, so that the DCI size limit would not be exceeded.

For each scheduled cell, the UE is not required to monitor on the active DL BWP with SCS configuration μ of the scheduling cell more than $$\min\left(M_{PDCCH}^{max,slot,\mu}, M_{PDCCH}^{total,slot,\mu}\right)$$

PDCCH candidates or more than $$\min\left(C_{PDCCH}^{max,slot,\mu}, C_{PDCCH}^{total,slot,\mu}\right)$$

non-overlapped CCEs per slot, wherein $$M_{PDCCH}^{max,slot,\mu}$$

and $$C_{PDCCH}^{max,slot,\mu}$$

are respectively a maximum number of PDCCH candidates and non-overlapping CCEs for a scheduled cell and $$M_{PDCCH}^{total,slot,\mu}$$

and $$C_{PDCCH}^{total,slot,\mu}$$

are respectively a total number of PDCCH candidates and non-overlapping CCEs for a scheduling cell, as described in TS 38.213 [REF3] v17.6.0.

A UE does not expect to be configured CSS sets, other than CSS sets for multicast PDSCH scheduling, that result to corresponding total, or per scheduled cell, numbers of monitored PDCCH candidates and non-overlapped CCEs per slot on the primary cell that exceed the corresponding maximum numbers per slot. For USS sets or for CSS sets associated with multicast PDSCH scheduling, when a number of PDCCH candidates or non-overlapping CCEs in a slot would exceed the limits/maximum per slot for scheduling on the primary cell mentioned herein, the UE selects the USS sets or the CSS sets to monitor corresponding PDCCH in an ascending order of a corresponding search space set index until and an index of a search space set for which PDCCH monitoring would result to exceeding the maximum number of PDCCH candidates or non-overlapping CCEs per slot for scheduling on the PCell as described in TS 38.213 [REF3] v17.6.0.

For same cell scheduling or for cross-carrier scheduling where a scheduling cell and scheduled cells have DL BWPs with same SCS configuration μ, a UE does not expect a number of PDCCH candidates, and a number of corresponding non-overlapped CCEs per slot on a secondary cell to be larger than the corresponding numbers that the UE is capable of monitoring on the secondary cell per slot. For cross-carrier scheduling, the number of PDCCH candidates for monitoring and the number of non-overlapped CCEs per slot are separately counted for each scheduled cell.

A UE can be configured for operation with carrier aggregation (CA) for PDSCH receptions over multiple cells (DL CA) or for PUSCH transmissions over multiple cells (UL CA). The UE can also be configured multiple transmission-reception points (TRPs) per cell via indication (or absence of indication) of a coresetPoolIndex for CORESETs where the UE receives PDCCH/PDSCH from a corresponding TRP as described in TS 38.213 [REF3] v17.6.0 and TS 38.214 [REF4] v17.6.0.

MIMO technologies have a key role in boosting system throughput both in NR and LTE and such a role will continue and further expand in the future generations of wireless technologies. For MIMO operation, an antenna port is defined such that a channel over which a symbol on the antenna port is conveyed can be inferred from the channel over which another symbol on the same antenna port is conveyed. There is not necessarily a one to one correspondence between an antenna port and an antenna element, and a plurality of antenna elements can be mapped onto one antenna port.

Figure 9A:
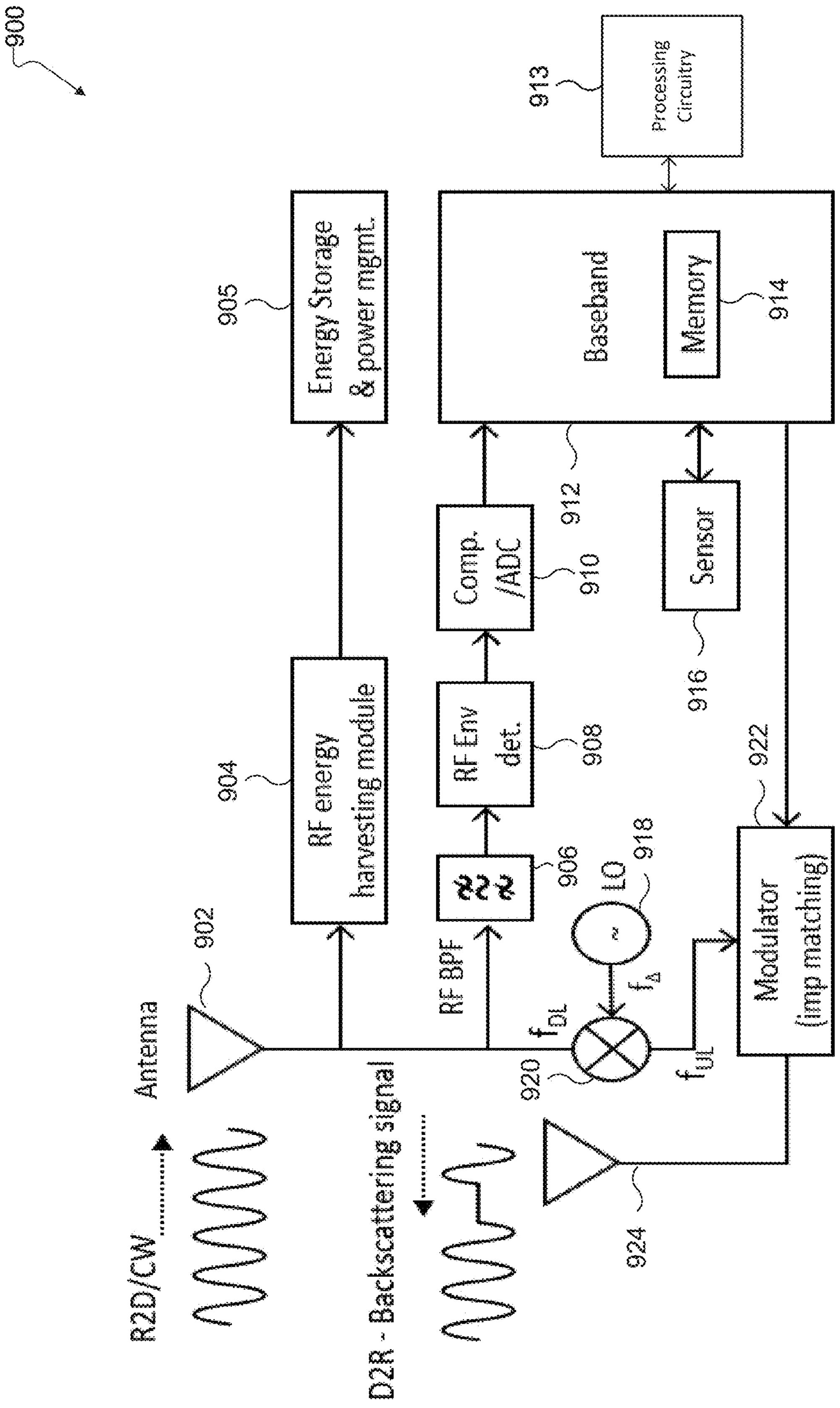
FIGS. 9A and 9B illustrate diagrams of example type-1 backscatter structures for IoT devices according to embodiments of the present disclosure.
Figure 9B:
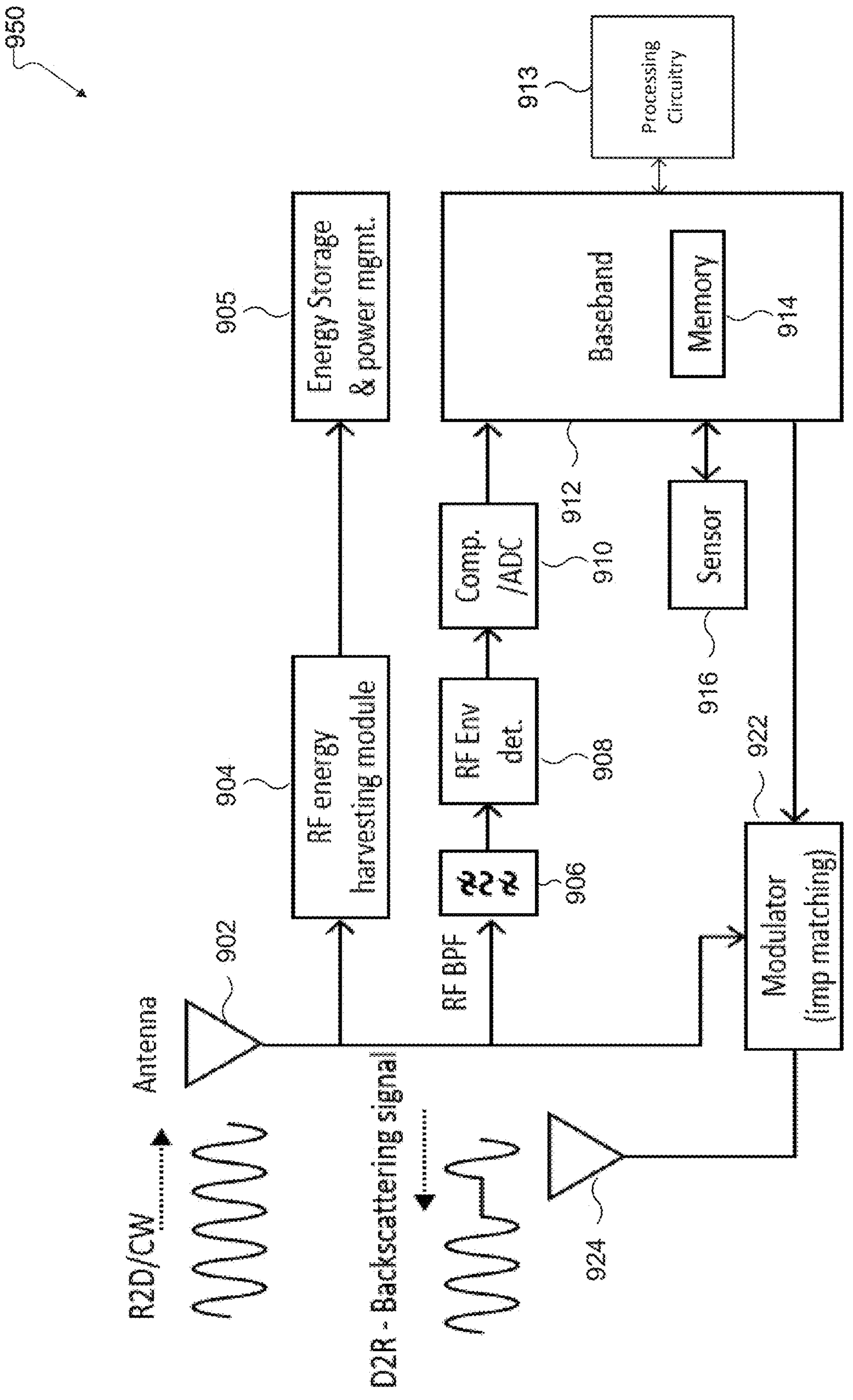

FIGS. 9A and 9B illustrate diagrams of example type-1 backscatter structures for IoT devices 900 and 950 according to embodiments of the present disclosure. For example, the IoT devices 900 and 950 can be implemented by a UE, such as UE 116 of FIG. 3, or may be devices with fewer components and functionality than a UE. This example is for illustration only and other embodiments can be used without departing from the scope of the present disclosure.

As shown in FIG. 9A, the type-1 backscatter structure for IoT device 900 includes an antenna 902, a RF energy harvesting module 904, an energy storage and power management 905, a RF bandpass filter (BPF) 906, a RF envelope detector 908, a comparator/analog to digital converter (ADC) 910, a baseband 912, processing circuitry 913, a memory 914, a sensor 916, a local oscillator (LO) 918, a mixer 920, a modulator (impedance matching) 922, and an antenna 924.

As shown in FIG. 9B, the type-1 backscatter structure for IoT device 950 includes an antenna 902, a RF energy harvesting module 904, an energy storage and power management 905, a RF BPF 906, a RF envelope detector 908, a comparator/ADC 910, a baseband 912, processing circuitry 913, a memory 914, a sensor 916, a modulator (impedance matching) 922, and an antenna 924.

Several different types of A-IoT devices are provided. One device type has ~1 μW peak power consumption, energy storage, initial sampling frequency offset (SFO) up to $10^X$ ppm, neither DL nor UL amplification in the device, wherein the device's D2R transmission is backscattered on a carrier wave (CW) provided externally. This type of device is referred to as Type-1 backscatter device, or Type-1 device in short, in this disclosure. Another type of device has ≤ a few hundred μW peak power consumption, energy storage, initial sampling frequency offset (SFO) up to $10^X$ ppm, both DL and/or UL amplification in the device, wherein the device's D2R transmission may be generated internally by the device, or be backscattered on a CW provided externally, which are referred to as Type-2 active device and Type-2 backscatter device, respectively.

With reference to FIGS. 9A and 9B, an example Type-1 backscatter device structures are shown.

The RF energy harvesting via RF energy harvesting module 904 can be a viable solution for supplying power to a Type-1 backscatter device requiring ~1 μW peak power consumption. Either a R2D signal or an externally provisioned CW signal for backscattering can be utilized for RF energy harvesting. The CW is externally provided from a reader or a dedicated source. The source of CW signal, e.g., either a reader or a dedicated node, shall be agnostic to A-IoT devices. The harvested energy, e.g., using a rectifier, can be stored using a capacitor, super-capacitor, or, generally speaking, an energy storage of an energy storage and power management (component) 905.

The R2D signal is demodulated using a low complexity RF envelop detector 908 and comparator, whose output is provided as an input to the baseband 912. Given the low-power and low-complexity requirements of the Type-1 backscatter device, RF envelop detection is a viable solution for a receiver architecture, compared to a heterodyne architecture with IF envelope detection or a homodyne architecture with baseband envelope detection, which require LO and frequency mixer for frequency down-conversion. The input RF signal passes through an RF BPF 906, in the case of one or more implementations described herein, for an adjacent channel interference suppression, and then the filtered RF signal is directly converted into a digital signal using RF envelop detector 908 and an comparator/ADC 910, which can include an n-bit comparator, depending on the modulation scheme.

For the D2R backscatter transmission, the following cases are provided:

- Case 1) CW is provisioned at DL spectrum and backscattered, i.e., CW @ DL spectrum, D2R backscattering @ DL spectrum.
- Case 2) CW is provisioned at UL spectrum and backscattered, i.e., CW @ UL spectrum, D2R backscattering @ UL spectrum.
- Case 3) CW is provisioned at DL spectrum, frequency shifted to UL spectrum, and then backscattered, i.e., CW @ DL spectrum, D2R backscattering @ UL spectrum.

The time division duplexing (TDD) spectrum case can be evaluated similarly as one of the Case 1) or Case 2), i.e., CW and D2R backscattering on the same frequency. The Case 3) for frequency division duplexing (FDD) spectrum requires a frequency shifter due to a duplex spacing which requires LO and frequency mixer. The duplex spacing of FDD spectrum ranges from at least 10 MHz to a few hundred MHz depending on the carrier frequency.

One or more implementations described herein expects Case 3), i.e., the D2R signal transmission is via backscattering of the externally provided CW involving a frequency shifter, if the CW is provided in a frequency different than the UL carrier frequency. Type-1 backscatter can also operate in a TDD spectrum. In this case, the device does not require a frequency shifter to obtain a desired frequency shifting. Taking into account that the A-IoT devices are targeting for low complexity and low power consumption, the following embodiments are provided as an example methods for frequency shift:

- Ultra-low power LO, whose output frequency is multiplied in one or more stages using a frequency multiplier to obtain a desired amount of frequency shift.
- Calibrated resistor-capacitor (RC) oscillator, which uses CW frequency as an input to the RC oscillator with phase locked loop (PLL) circuitry.
- CW signal provided at the UL carrier frequency; In this case, no frequency shifter is needed.
- Use of harmonic frequencies of CW signal or intermodulation frequencies of two-tone CW signals.

One or more implementations described herein expect either Case 1) or Case 2), which does not require a frequency shifter.

The IoT devices 900 and 950 can further include processing circuitry 913, which may be a full-powered processor, such as included in UE 116, a lower-power microprocessor or microcontroller, an application specific integrated circuit (ASIC), or logic circuitry. The processing circuitry 913 can control the overall operation of the IoT device including determination of reception and/or transmission timing. The processing circuitry 913 may be powered via energy storage and power management 905. The signal receiving and transmitting processing circuitry included in the IoT devices, such as RF BPF 906, a RF envelope detector 908, a comparator/analog to digital converter (ADC) 910, a baseband 912, a LO 918, a mixer 920, a modulator (impedance matching) 922, may be referred to as a transceiver, which may use separate antennas 902 and 924 for reception and transmission, respectively, or may use a common antenna, such as antenna 902 in FIGS. 11B-12B discussed below, for transmission and reception. One or more implementations described herein further include other implementation variations such as separate Tx-Rx antennas vs common Tx-Rx antenna, use of a sensor, etc. The implementations should be understood as an example and not as a restriction.

Figure 10:
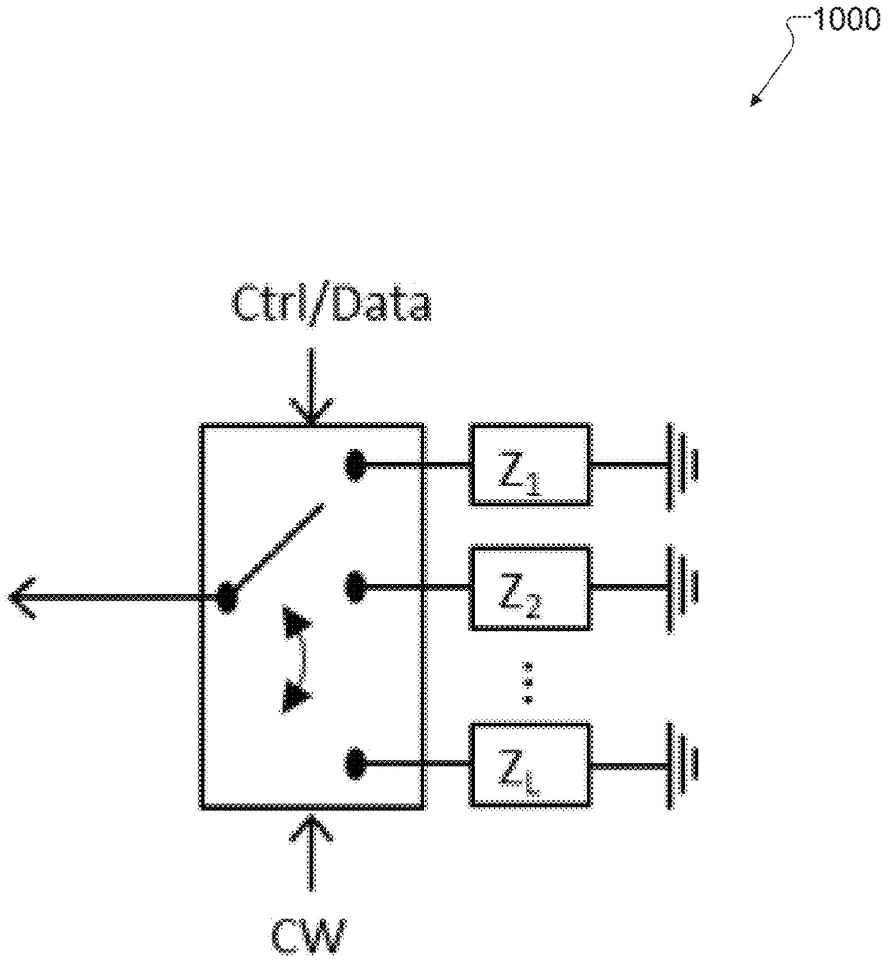
FIG. 10 illustrates a diagram of an example impedance matching circuit according to embodiments of the present disclosure.

FIG. 10 illustrates a diagram of an example impedance matching circuit 1000 according to embodiments of the present disclosure. For example, impedance matching circuit 1000 can be implemented in the modulator (impedance matching) 922 of an IoT device. This example is for illustration only and other embodiments can be used without departing from the scope of the present disclosure.

With reference to FIG. 10, an example impedance matching circuit 1000 for backscatter device D2R modulation is shown.

The followings are simple examples of impedance matching operations:

- Open circuit: Full reflection of the received CW signal in the same phase. This can be used for OOK modulation with matching circuit.
- Short circuit: Full reflection of the received CW signal in the reversed phase. This can be used for phase-shift keying (PSK) modulation.
- Matching circuit: No reflection as the impedance is matched to a load, i.e., absorption. This can be utilized for energy harvesting, Rx mode, or modulation with other matching states.
- Multi-level matching circuit: As illustrated in FIG. 10. Multi-level impedance matching to $Z_1, Z_2, \ldots, Z_L$ for $\log_2(L)$ bits per symbol ASK modulation.

Depending on the matched load impedance, the matching circuit 1000 can backscatter the incoming CW signal with different reflection coefficients in both amplitude and phase. In general, ASK/phase shift keying (PSK)/frequency shift keying (FSK) may be supported using an impedance matching circuit. As a simplest modulation scheme, OOK may be utilized for A-IoT, given its low complexity. The UE may indicate its modulation capability or impedance matching capability to the network (e.g., the network 130), or certain requirement may be predefined in the specification of system operation.

Figure 11A:
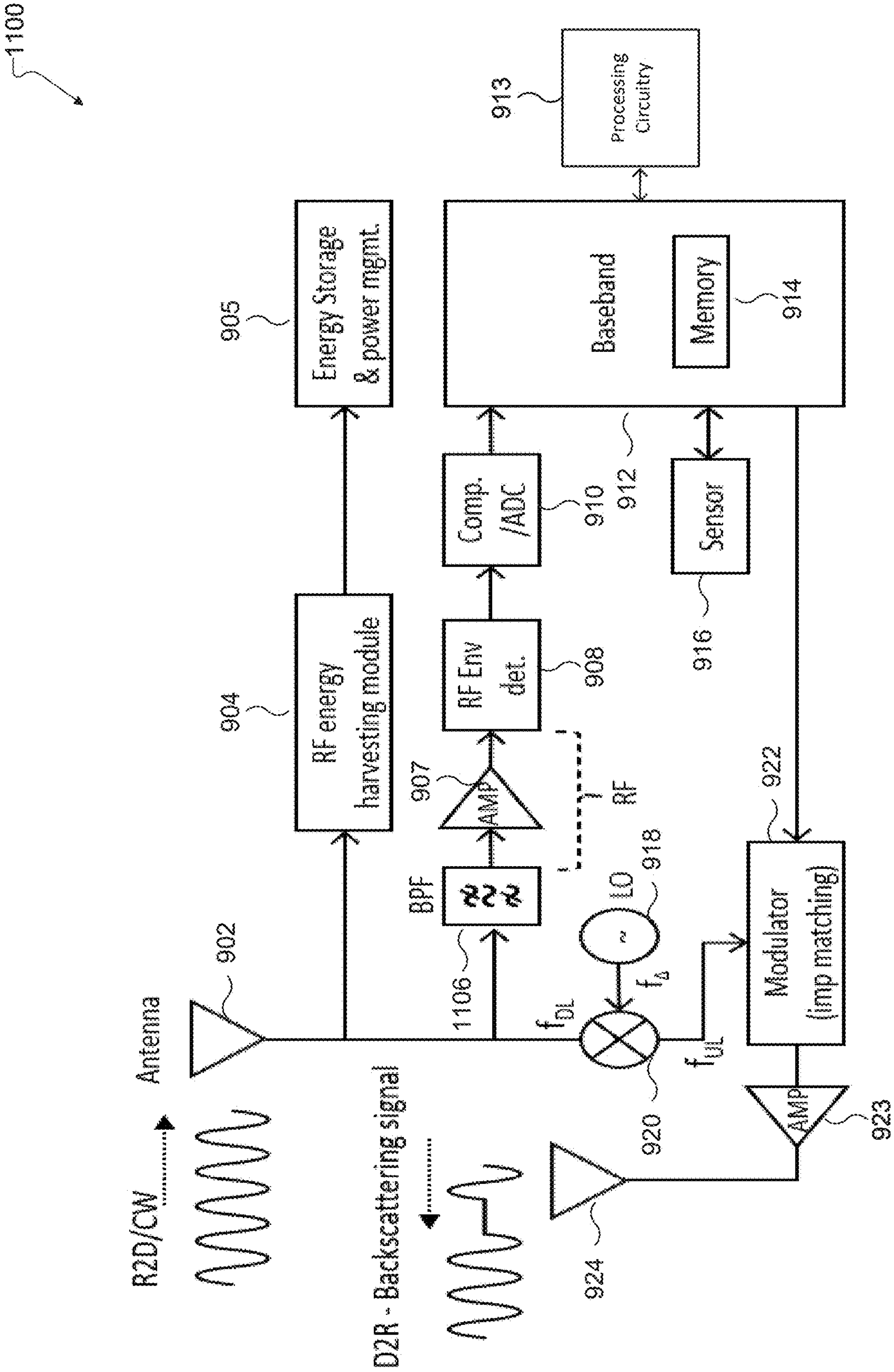
FIGS. 11A and 11B illustrate examples of type-2 backscatter structures for IoT devices according to embodiments of the present disclosure.
Figure 11B:
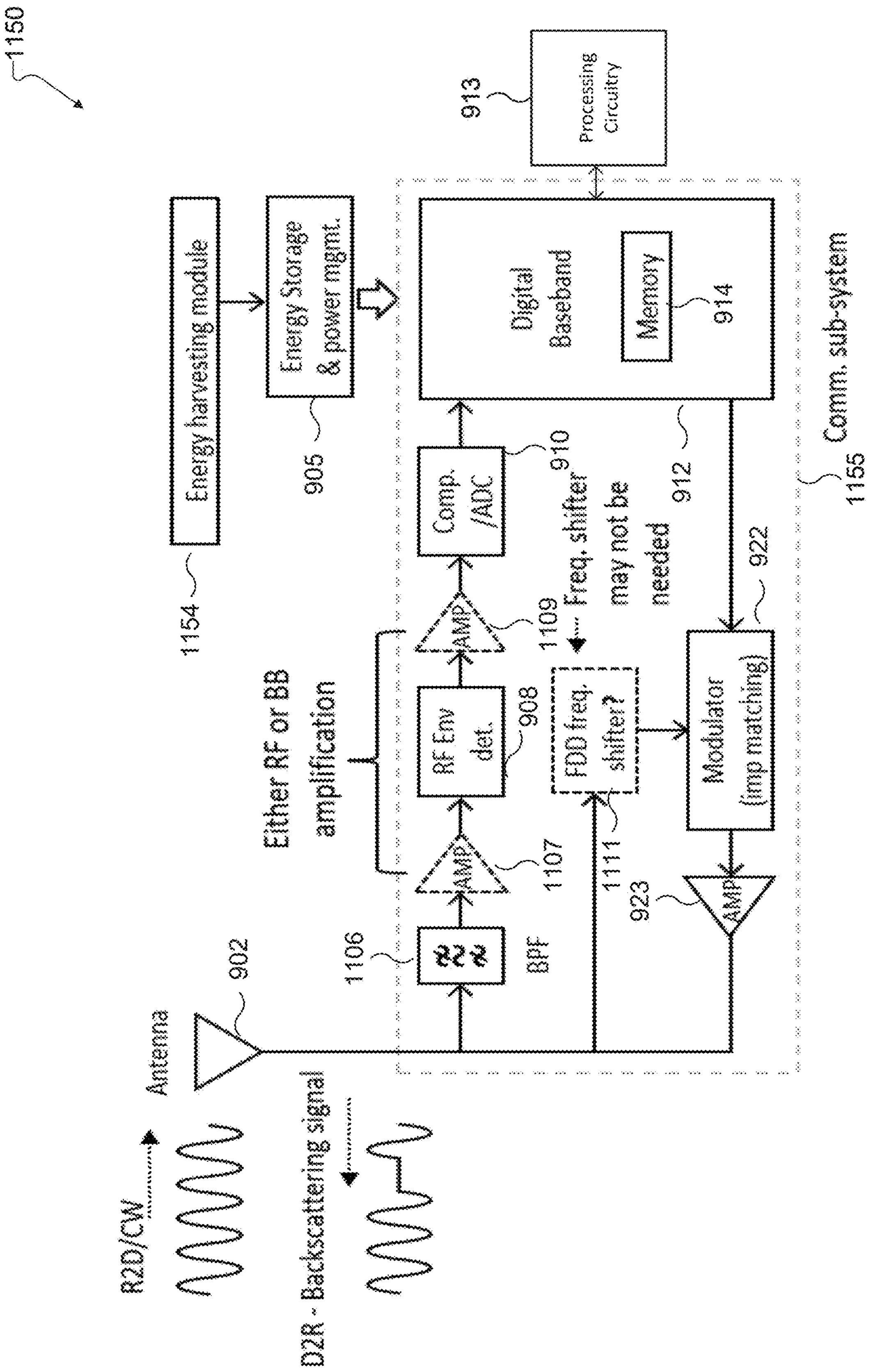

FIGS. 11A and 11B illustrate examples of type-2 backscatter structures for IoT devices 1100 and 1150 according to embodiments of the present disclosure. For example, IoT 1100 and 1150 can be implemented by a UE, such as UE 116 of FIG. 3, or may be devices with fewer components and functionality than a UE. This example is for illustration only and other embodiments can be used without departing from the scope of the present disclosure.

As shown in FIG. 11A, type-2 backscatter structure IoT device 1100 includes an antenna 902, an energy harvesting module 904, an energy storage and power management (component) 905, a bandpass filter 1106, amplifier 907, a RF envelope detector 908, a comparator/ADC 910, a baseband 912, processing circuitry 913, a memory 914, a sensor 916, a LO 918, a mixer 920, a modulator (impedance matching) 922, amplifier 923, and an antenna 924.

As shown in FIG. 11B, type-2 backscatter structure 1150 includes an antenna 902, an energy harvesting module 1154, an energy storage and power management (component) 905, and a communication sub-system 1155. The communication sub-system 1155 includes a bandpass filter 1106, amplifier 1107, a RF envelope detector 908, amplifier 1190, a comparator/ADC 910, a digital baseband 1112, processing circuitry 913, a memory 914, a modulator (impedance matching) 922, an amplifier 923, and a (optional) FDD frequency shifter 1111.

With reference to FIG. 11, example Type-2 backscatter device structures are shown.

The Type-2 backscatter device may share similar structure at large with the Type-1 device as the D2R transmission is still based on backscattering of an externally provided CW, while the Type-2 backscatter device may differ from Type-1 device from the following aspects.

The Type-2 device has ≤ a few hundred µW peak power consumption and both DL and/or UL amplification in the device. In this case, alternative to the RF energy harvesting from a R2D signal (e.g., a PRDCH) or an externally provided CW signal as illustrated in one or more implementations described herein, other renewable energy sources, e.g., solar, thermal, kinetic, etc., may be evaluated for energy harvesting, as illustrated in one or more implementations described herein. The presence of a certain energy harvesting capability from a certain renewable energy source may be expected for system design point of view.

The Type-2 devices may be equipped with both DL and/or UL amplification in the device. Given the power consumption requirement, i.e., ≤ a few hundred µW, the DL/UL amplification for Type-2 devices may be based on an architecture that is different from the common power amplifier (PA) and low noise amplifier (LNA) based on metal-oxide-semiconductor field-effect transistor (MOSFET). In some example low-power/complexity forward amplification (for R2D reception) and reflection amplification (for D2R backscattering) architectures, a single bipolar transistor terminated with microstrips may be used. The DL amplification can be either RF amplification by amplifier 907 prior to the envelop detector 908, as illustrated in one or more implementations described herein, or baseband amplification by amplifier 1109 prior to the comparator/ADC 910 as illustrated in one or more implementations described herein, which is an implementational choice.

One additional difference of Type-2 devices compared to Type-1 devices may be a use of FDD frequency shifter. With a few hundred µW peak power consumption, some low-power LO architectures with a frequency mixer 920 can be envisioned for Case 3).

Figure 12A:
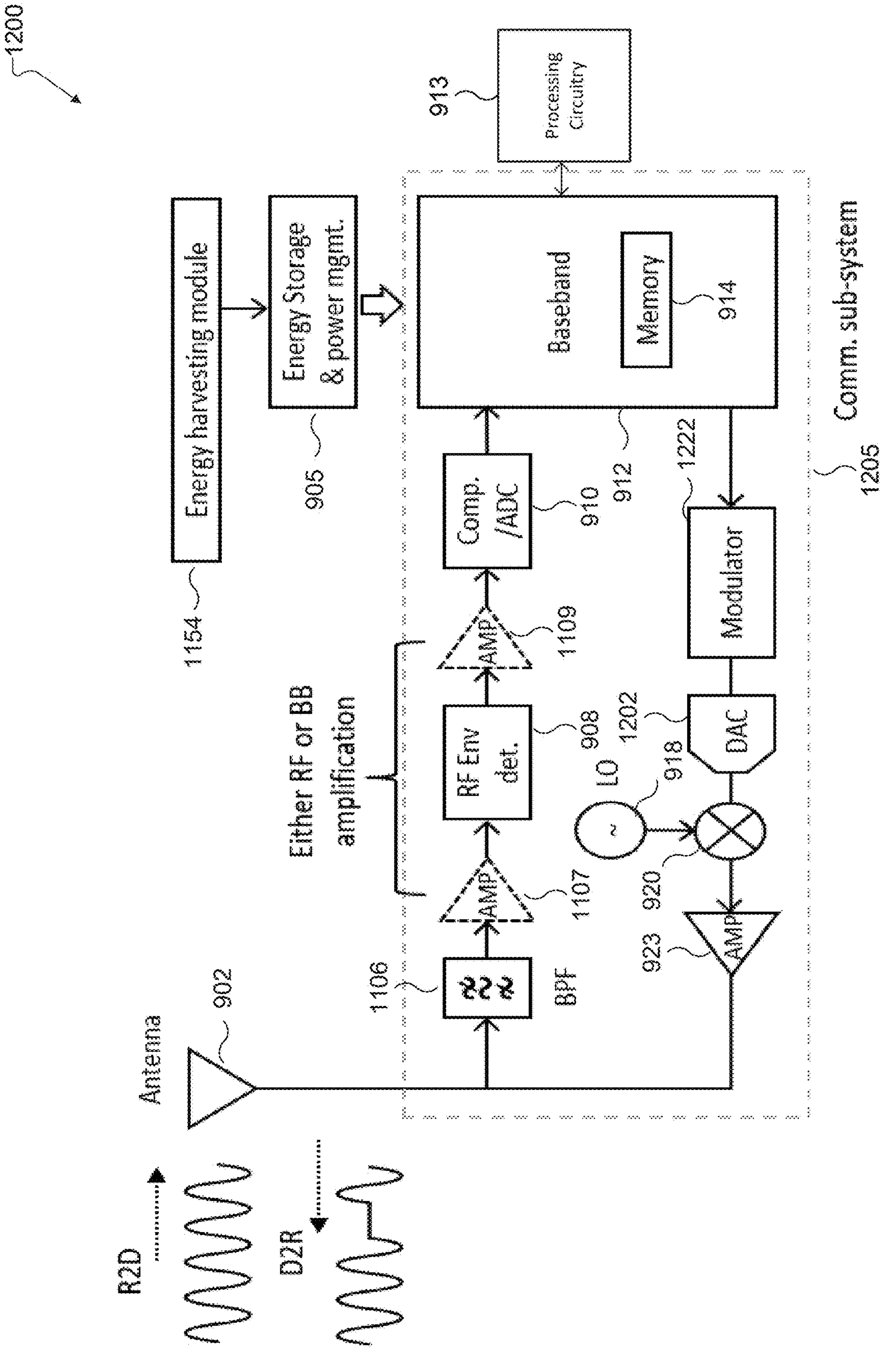
FIGS. 12A and 12B illustrate examples of type-2 active structures for IoT devices according to embodiments of the present disclosure.
Figure 12B:
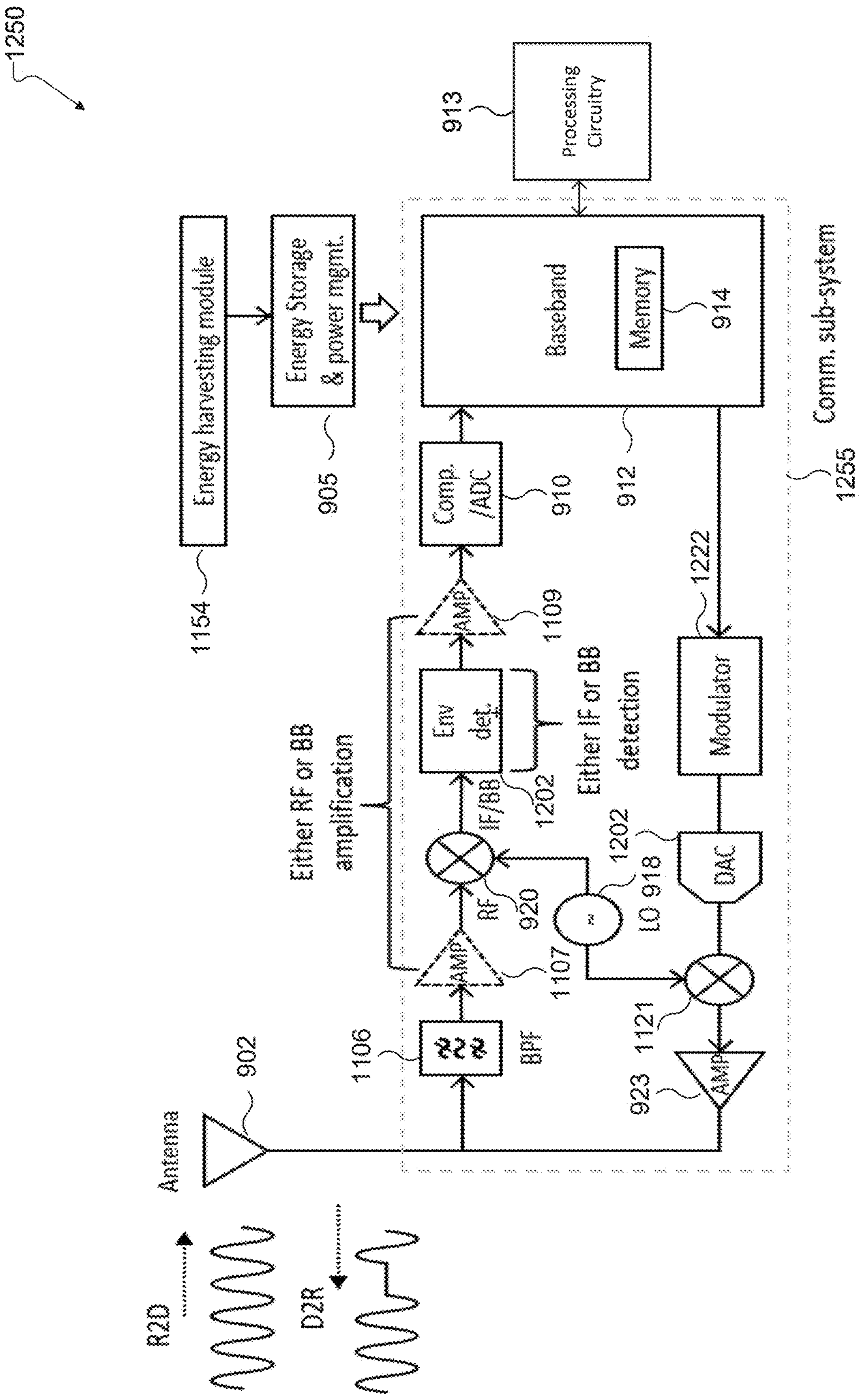

FIGS. 12A and 12B illustrate examples of type-2 active structures for IoT devices 1200 and 1250 according to embodiments of the present disclosure. For example, IoT devices 1200 and 1250 can be implemented by a UE, such as UE 116 of FIG. 3, or may be devices with fewer components and functionality than a UE. This example is for illustration only and other embodiments can be used without departing from the scope of the present disclosure.

As shown in FIG. 12A, the type-2 active structure of IoT device 1200 includes an antenna 902, an energy harvesting module 1154, an energy storage and power management (component) 905, and a communication sub-system 1205. The communication sub-system 1205 includes a bandpass filter 1106, an amplifier 1107, a RF envelop detector 908, an amplifier 1109, a comparator/ADC 910, a baseband 912, processing circuitry 913, a memory 914, a modulator 1222, a digital to analog converter (DAC) 1202, a LO 918, a mixer 920, and an amplifier 923.

As shown in FIG. 12B, the type-2 active structure of IoT device 1250 includes an antenna 902, an energy harvesting module 1154, an energy storage and power management (component) 905, and a communication sub-system 1255. The communication sub-system includes a bandpass filter 1106, amplifier 1107, a mixer 920, an envelope detector 1202, an amplifier 1109, a comparator/ADC 910, a baseband 912, processing circuitry 913, a memory 914, a modulator 1222, a DAC 1202, a mixer 1121, and an amplifier 923.

With reference to FIG. 12, an example Type-2 active device structure is shown.

The Type-2 active device shares similar structure at large with the Type-2 passive device other than the UL signal is internally generated using LO rather than backscattering the externally provided CW. The example architecture shown in FIG. 12 is based on a common active transmitter chain, wherein the D2R data is modulated, converted to an analog signal using digital to analog converter (DAC) and, then up-converted to a UL carrier frequency using LO and frequency mixer, which is followed by an amplifier.

In one or more implementations described herein, the R2D receiver chain is still based on the RF envelop detector 908 as in the previous architectures. In one or more implementations described herein, the R2D receiver chain is based on IF or BB envelop detection. In the heterodyne architecture, the RF signal is down converted into an intermediate frequency and then detected using envelope detector 908. In the homodyne/zero-IF architecture, the RF signal is directly down converted into baseband signal and then detected using envelope detector 1202.

FIGS. 9-12 should be understood for illustration purpose only. There can be other components not explicitly shown in the figure such as switch, duplexer, and filters, or some components may be replaced to different options. Also, the devices can operate both in TDD and FDD spectrum and, depending on the operating spectrum, the actual architectures can be different from the conceptual illustrations in the figures.

In deploying A-IoT devices, different topology options can be evaluated. The following provides examples of topology options:

Topology 1: BS (e.g., the BS 102)↔A-IoT device

An A-IoT device directly and bidirectionally communicates with a base station. The communication between the base station and the A-IoT device includes A-IoT data and/or signalling. This topology includes that the BS transmitting to the A-IoT device is different from the BS receiving from the A-IoT device.

Topology 2: BS↔intermediate node↔Ambient IoT device

An A-IoT device communicates bidirectionally with an intermediate node between the device and base station. In this topology, the intermediate node can be a relay, integrated access and backhaul (IAB) node, UE, repeater, etc. which is capable of A-IoT. The intermediate node transfers A-IoT data and/or signalling between BS and the A-IoT device. The intermediate node is referred to as I-node in this disclosure.

Topology 3: BS↔assisting node↔Ambient IoT device↔BS

An A-IoT device transmits data/signalling to a base station, and receives data/signalling from the assisting node; or the A-IoT device receives data/signalling from a base station and transmits data/signalling to the assisting node. In this topology, the assisting node can be a relay, IAB, UE, repeater, etc. which is capable of A-IoT.

Topology 4: UE↔Ambient IoT device

An A-IoT device communicates bidirectionally with a UE. The communication between UE and the A-IoT device includes A-IoT data and/or signalling.

This disclosure is applicable at least to the following deployment scenarios:

Scenario 1: Device indoors, BS indoors

Scenario 2: Device indoors, BS outdoors

Scenario 3: Device indoors, UE-based reader

Scenario 4: Device outdoors, BS outdoors

Scenario 5: Device outdoors, UE-based reader

The deployment of A-IoT can be on the same sites as an existing 3GPP deployment corresponding to the BS type, e.g., macro-cell, micro-cell, pic-cell, etc. In some embodiments, it may be expected that the deployment of A-IoT can be on new sites without an assumption of an existing 3GPP deployment. The deployment can be based on licensed or unlicensed TDD or FDD spectrum, which may be in-band to an existing deployment, in guard-band of an existing deployment, or in a standalone band. Different traffic types can be supported including device-terminated (DT) and device-originated (DO), wherein DO traffic can be further divided into DO autonomous (DO-A), and DO device-terminated triggered (DO-DTT) types.

A-IoT device is one type of a UE. Embodiments in this disclosure can be generally applicable to other types of UEs, e.g., smartphones, AR/VR devices, or any other types of IoT devices. Any operations performed by BS in this disclosure can be also performed by an I-node, such as a reader UE, instead of the BS, and each or part of interfaces are transparent to the A-IoT devices.

Figure 13:
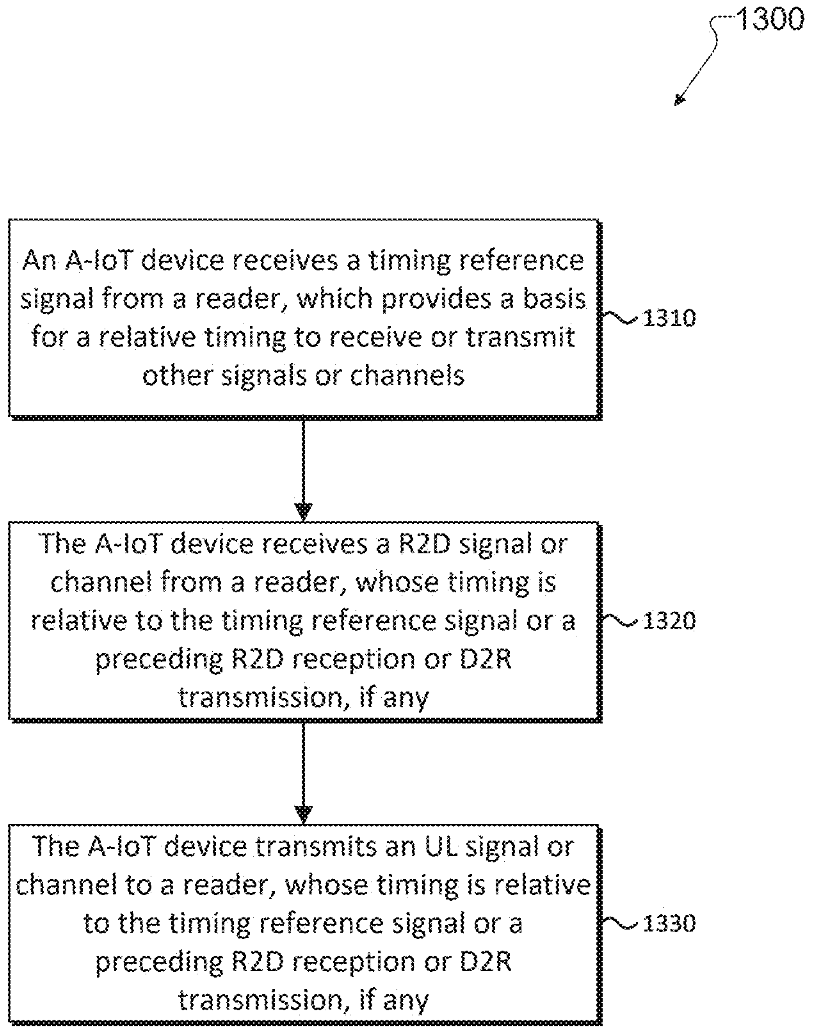
FIG. 13 illustrates a flowchart of an example procedure for transmitting/receiving according to embodiments of the present disclosure.

FIG. 13 illustrates a flowchart of an example procedure 1300 for transmitting/receiving according to embodiments of the present disclosure. For example, procedure 1300 for transmitting/receiving can be performed by an A-IoT device, such as IoT devices 900, 950, 1100, 1115, 1200, or 1250. This example is for illustration only and other embodiments can be used without departing from the scope of the present disclosure.

The procedure begins in 1310, an A-IoT device receives a timing reference signal from a reader, which provides a basis for a relative timing to receive or transmit other signals or channels. In 1320, the A-IoT device receives a R2D signal or channel from a reader, whose timing is relative to the timing reference signal or a preceding R2D reception or D2R transmission, if any. In 1330, the A-IoT device transmits an D2R signal or channel to a reader, whose timing is relative to the timing reference signal or a preceding R2D reception or D2R transmission, if any.

The timing reference signal in 1310 can be a sequence-based signal whose presence can be detected at low complexity and provided as a part of other signals such as a paging, which is also referred to as a beacon or as an A-IoT SSB (A-SSB) signal. An example of timing reference signals can be as follows:

A preamble signal, e.g., a certain time domain sequence or signal pattern, i.e., signature, which is modulated using, e.g., OOK, that is known and detectable by A-IoT devices. In another embodiment, it can be a frequency domain sequence populated on a number of subcarriers. The signal can be repeated in one or more times in time or frequency domain. In one example, it is transmitted on a single carrier, e.g., using OOK modulation.

One of a primary synchronization signal (PSS) sequence from a set of PSS sequences, one of a secondary synchronization signal (SSS) sequence from a set of SSS sequences, or a pair of a PSS sequence and an SSS sequence from a set of PSS sequences and from a set of SSS sequences, respectively. The one of a PSS sequence and/or the one of an SSS sequence is known and detectable without hypotheses testing by A-IoT devices. In this case wherein the PSS and SSS sequences are fixed, the physical cell ID (PCI) may be directly provided in a payload of the signal as the PCI cannot be derived from detecting PSS and SSS sequences from a set of sequences. The sequence may be mapped in a frequency domain on a number of subcarriers or transmitted in a time domain on a single carrier, e.g., using OOK. The sequence may be a modified version from an existing NR PSS/SSS sequences, e.g., a shortened m-sequence from the NR length-127 sequence or LTE Zadoff-Chu sequence.

The timing reference signal may be prepended and appended with a specific sequence or pattern, e.g., delimiter, for start-of-signal and end-of-signal detections, respectively.

In the following steps, the A-IoT device receives a R2D signal or channel from a reader, whose timing is relative to the timing reference signal or a preceding R2D reception or D2R transmission, if any 1320, and transmits a D2R signal or channel to a reader, whose timing is relative to the timing reference signal or a preceding R2D reception or D2R transmission, if any 1330. The basis of reference timing can be either the previously received timing reference signal or other preceding R2D or D2R signals and channels. For providing a timing reference, R2D/D2R signals and channels may include timing reference signals and/or delimiter for start-of-signal and end-of-signal detections.

With reference to FIG. 13, an example flowchart of IoT device to transmit or receive based on a relative timing to a timing reference signal according to the disclosure is shown. The network-triggered asynchronous system with relative timing is based on the following simple principles:

D2R transmissions are triggered by the reader.

D2R transmissions follow the preceding R2D transmission with certain time intervals.

R2D/D2R signals/channels start with a preamble providing low-complexity presence detection as well as a timing of the signal/channel.

Figure 14:
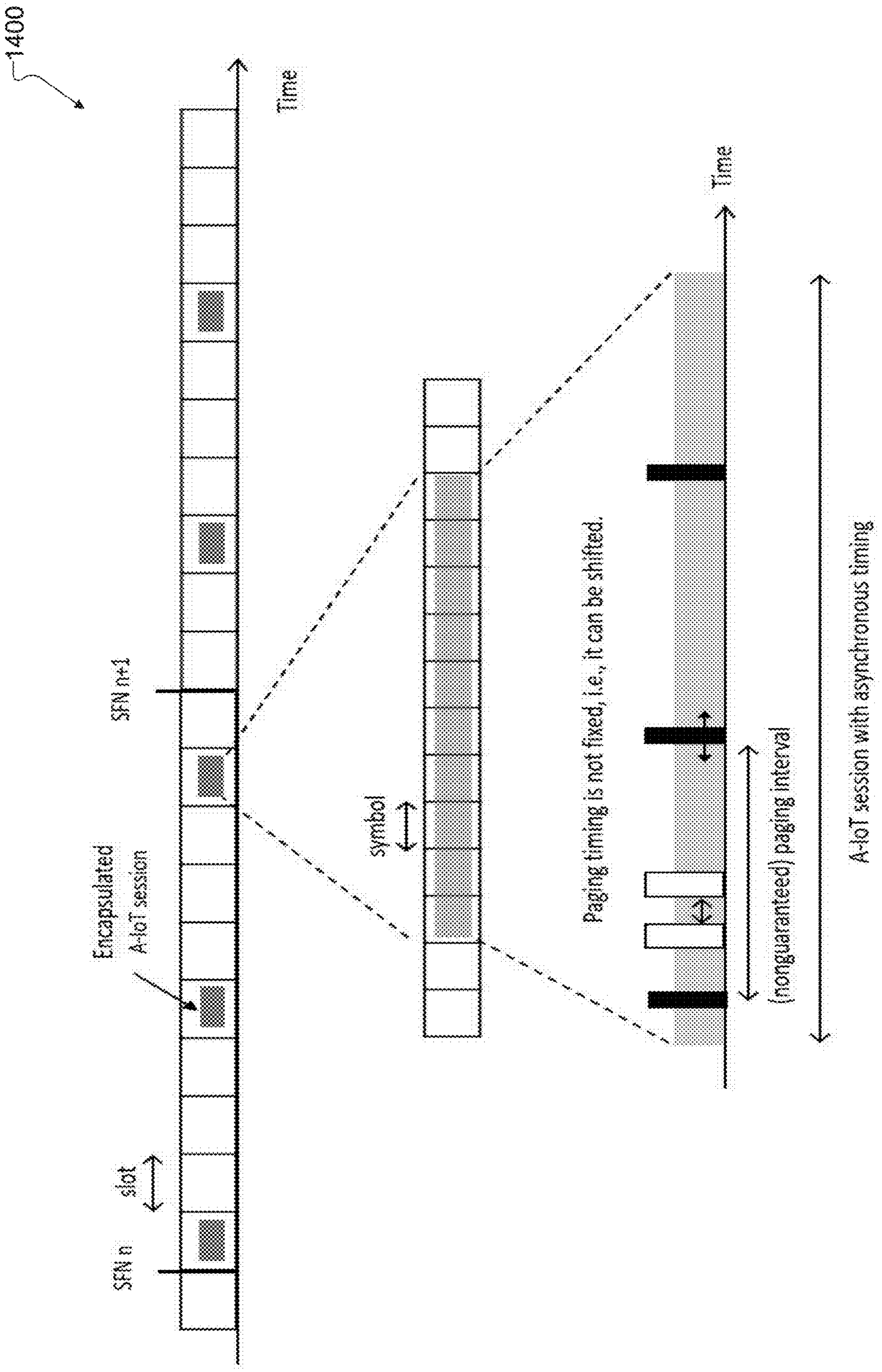
FIG. 14 illustrates a timeline for example network (NW)-guided asynchronous systems according to embodiments of the present disclosure.

FIG. 14 illustrates a timeline 1400 for example network (NW)-guided asynchronous systems according to embodiments of the present disclosure. For example, timeline 1400 can be followed by the IoT devices described herein. This example is for illustration only and other embodiments can be used without departing from the scope of the present disclosure.

The general principle for NW-guided asynchronous system with relative timing, for example due to a lack of a capability of an A-IoT device to keep track of an absolute timing, includes a reception of a timing reference signal from a reader, which provides a basis for a relative timing to receive or transmit other signals or channels to the A-IoT device. The device then receives a R2D signal or channel from the reader or transmits a D2R signal or channel to the reader, whose timing is relative to the timing reference signal or a preceding R2D reception or D2R transmission, if any.

FIG. 14 illustrates an example NW-guided asynchronous system with relative timing encapsulated in a synchronous system according to the disclosure. In FIG. 14, the A-IoT deployment is in-band to an existing deployment of a synchronous system, in which there exist coexistence issues between A-IoT devices and other general UEs. The time/frequency resources used for A-IoT communication sessions may be indicated to other general UEs as reserved resources such that the other general UEs do not receive any periodic DL signals or channels such as PDCCH, semi-persistent scheduling (SPS) PDSCH, any types of RSs, e.g., CSI-RS, positioning reference signal (PRS), tracking reference signal (TRS), phase tracking reference signal (PT-RS), and do not transmit any periodic UL signals or channels such as scheduling request (SR), physical random access channel (PRACH), physical uplink control channel (PUCCH), hybrid automatic repeat request acknowledgement (HARQ ACK), CSI report, configured grant PUSCH (CG-PUSCH), sounding reference signal (SRS). The general UEs may be provided from a serving cell a set of parameters related to frequency domain reserved resources, e.g., resource block (RB)/resource block group (RBG) indexes, RB/RBG ranges, BWP, or frequency ranges, and a set of parameters related to time domain reserved resources, e.g., periodicity, offset, duration.

From an A-IoT device perspective, it may or may not be aware of a coexistence with other general UEs. In the case when A-IoT devices are agnostic to other general UEs, in-band coexistence is maintained by NW. This can be done by encapsulating an asynchronous A-IoT communication session in a synchronous system frame structure and as any D2R transmissions are triggered by the NW with relative timing relationship. In a standalone deployment, A-IoT session may be continuous.

Figure 15:
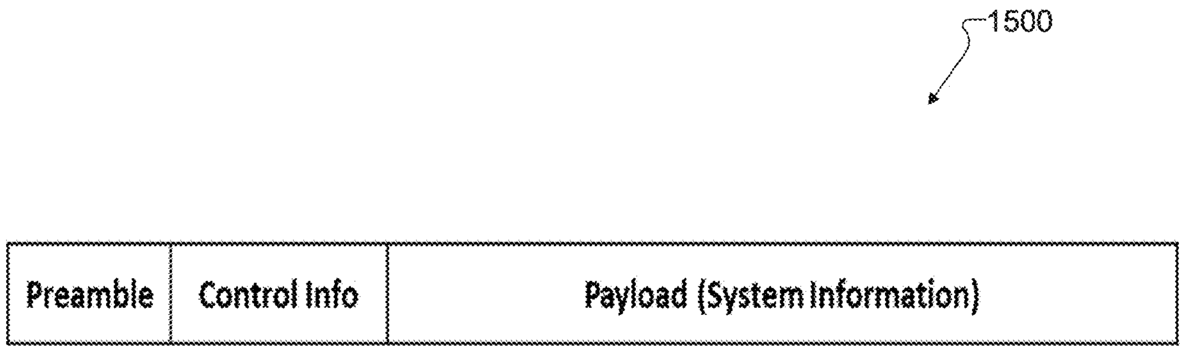
FIG. 15 illustrates a diagram of an example paging signal architecture according to embodiments of the present disclosure.

FIG. 15 illustrates a diagram of an example paging signal architecture 1500 according to embodiments of the present disclosure. For example, paging signal architecture 1500 can be provided by a BS or reader UE and detected by IoT devices described herein. This example is for illustration only and other embodiments can be used without departing from the scope of the present disclosure.

In another example, the paging signal serves as a means to indicate that A-IoT communication session is activated and on-going. In another example, the paging signal serves as a means to provide system information.

With reference to FIG. 15, an example illustration of a paging signal structure according to the disclosure is shown. If a paging signal is detected by an A-IoT device, the A-IoT device may expect a R2D reception or D2R transmission. Otherwise, if a paging signal is not detected for a certain time duration, the A-IoT device may expect that the A-IoT communication session is terminated or there is no nearby reader. Therefore, in this case, the paging signal serves the purpose of wake-up signal for A-IoT devices.

The paging signal may also provide system information. In this case, the control information indicates that the following payload includes system information. Some of the system information that can be evaluated to be provided includes PCI, channel BW, and parameters related to the random access. The paging signal may be also utilized for R2D pathloss measurement and D2R power control.

In one example, the paging transmission interval is fixed and thus an A-IoT device obtains timing synchronization from the paging. In one example, The paging transmission interval is not be fixed, i.e., it can be shifted, as it is not intended to provide a fixed timing basis for synchronization.

An A-IoT device may continuously monitor the presence of paging or, if the A-IoT device has a clock, it can monitor paging at a certain time span. In such cases, the periodic paging transmission schedule, e.g., periodicity and/or offset, can be provided in the paging as well.

Figure 16A:
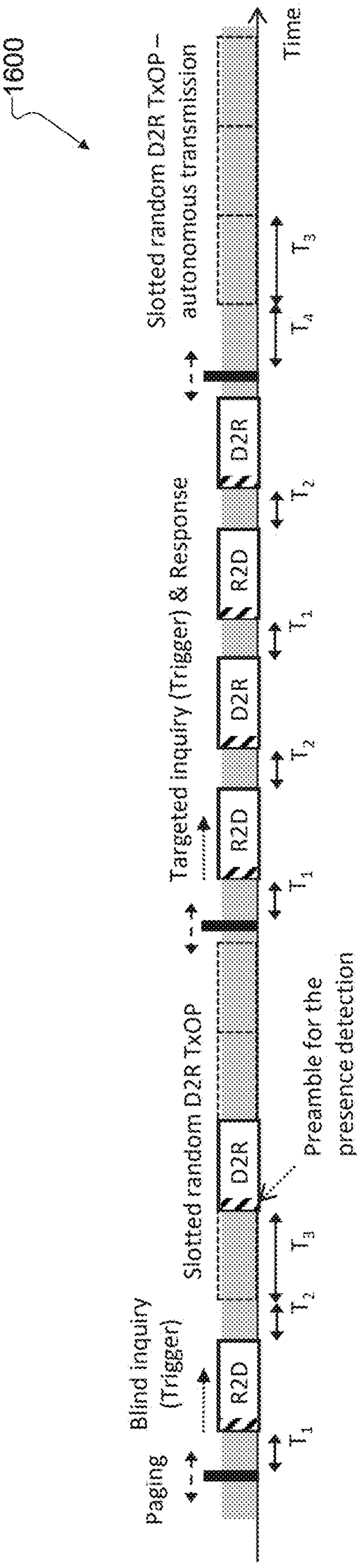
FIGS. 16A and 16B illustrate timelines for example NW-guided asynchronous and different communication modes according to embodiments of the present disclosure.
Figure 16B:
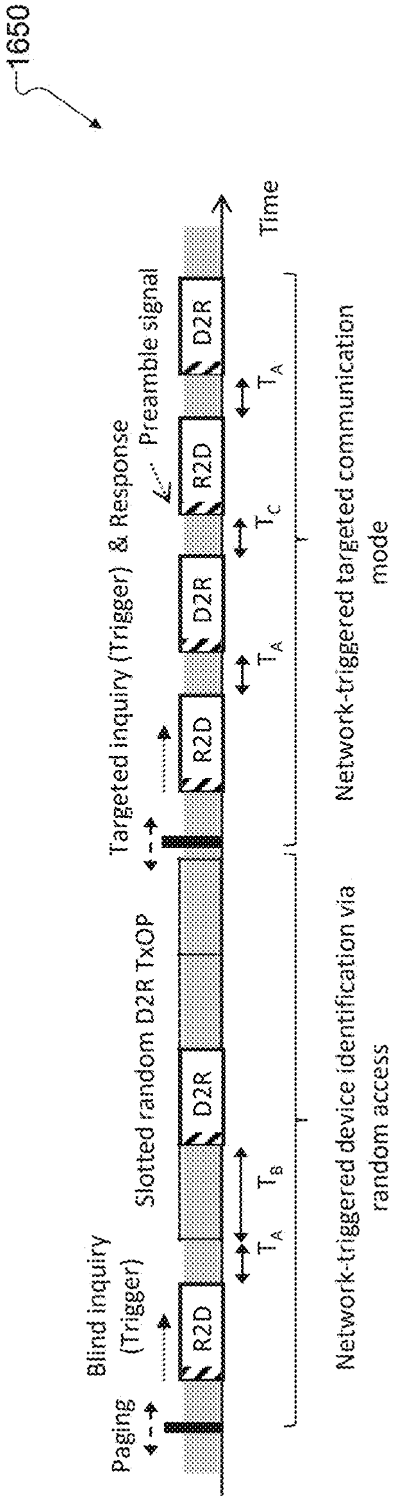

FIGS. 16A and 16B illustrate timelines 1600 and 1650, respectively, for example NW-guided asynchronous and different communication modes according to embodiments of the present disclosure. For example, timelines 1600 and 1650 can be followed by the IoT devices described herein. This example is for illustration only and other embodiments can be used without departing from the scope of the present disclosure.

With reference to FIG. 16, examples of NW-guided asynchronous system and different communication modes according to the disclosure is shown.

In the figure, it is illustrated such that R2D/D2R signals are prepended with a sequence for the presence detection, i.e., preamble.

In a NW-guided asynchronous system, the NW provides a basis for determining a relative timing and an A-IoT device doesn't need to maintain an absolute timing as one transmission follows another. In a NW-guided asynchronous system, one or more R2D/D2R transmissions are triggered and led by a transmission from a reader.

In Case A, the paging signal serves as a timing basis and an initial R2D transmission follows the preceding paging signal with time interval $T_1$. In Case B, the paging signal does not serve as a timing basis and a R2D transmission can start any time, not related to the paging timing.

In FIG. 16, the paging signal serves as a leading signal to which other signals follow. In order to prioritize different signals/channels or traffic types, e.g., DT, DO-DTT, and DO-A, or different QoS type traffics, e.g., video, voice, best effort, and background, one or multiple relative timing parameters can be defined as shown in the figure. In Case A, a R2D transmission can follow a preceding paging signal in $T_1$ time, while an autonomous transmission can start after $T_4$ time has elapsed. By assigning different amount of relative timing parameters to different transmissions, priorities between different transmissions can be applied. In one example, $T_1$ can be set to be shorter than $T_4$ such that R2D transmission from reader has higher priority than D2R autonomous transmission. In the figure, a D2R transmission in response to a preceding R2D transmission can start in $T_2$ time, and during the $T_2$ time no other transmissions can start and, thereby, providing highest priority to D2R response following R2D transmission.

In Case B, an D2R transmission may follow the preceding R2D transmission as early as in $T_A$. There may be multiple different $T_A$ parameters, i.e., $T_A'$, $T_A''$, . . . , to schedule a delayed D2R transmission for multiplexing transmissions from different A-IoT devices. The slot duration for random access transmission opportunities (TxOPs) is denoted by $T_B$. A R2D transmission may follow the preceding D2R transmission in $T_C$.

An A-IoT device may receive D2R scheduling information from a reader such as the serving gNB (e.g., the BS 102) including the timing parameter for D2R transmission. The D2R transmission timing may be referenced to the preceding R2D reception time. There may be multiple different sets of timing parameters. The timing parameters may be in ms, an integer multiple of certain time unit, such as basic time unit, symbol duration, or chip duration. The timing, in its absolute value or as an index from a set of predefined values, may be indicated to the UE in the preceding R2D transmission.

In another embodiment, a part or each of the relative timing parameters herein such as $T_1$, $T_2$, $T_3$, and $T_4$, or $T_A$, $T_B$, $T_C$ are provided in a paging as a part of system information or predefined in the specifications of the system operation.

Figure 17:
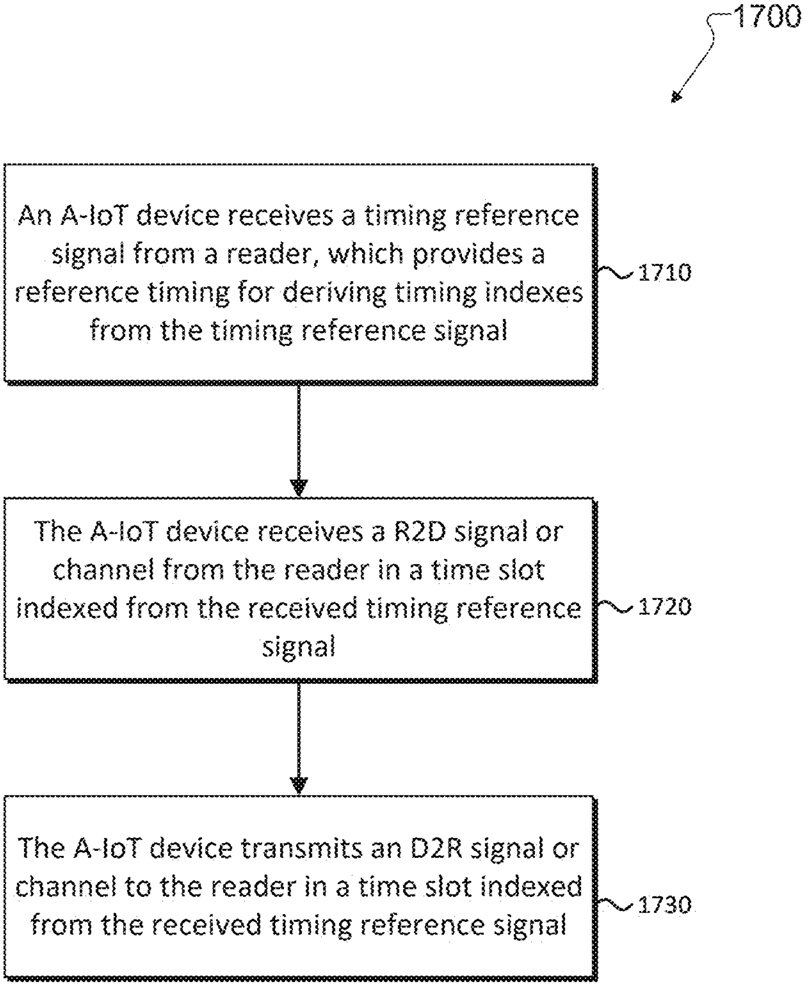
FIG. 17 illustrates a flowchart of an example procedure for transmitting/receiving according to embodiments of the present disclosure.

FIG. 17 illustrates a flowchart of an example procedure 1700 for transmitting/receiving according to embodiments of the present disclosure. For example, procedure 1700 for transmitting/receiving can be performed by the IoT devices described herein. This example is for illustration only and other embodiments can be used without departing from the scope of the present disclosure.

The procedure begins in 1710, an A-IoT device receives a timing reference signal from a reader, which provides a reference timing for deriving timing indexes from the timing reference signal. In 1720, the A-IoT device receives a R2D signal or channel from the reader in a time slot indexed from the received timing reference signal. In 1730, the A-IoT device transmits an D2R signal or channel to the reader in a time slot indexed from the received timing reference signal.

An A-IoT device receives a timing reference signal from a reader, which provides a reference timing for deriving timing indexes from the timing reference signal 1710. The boundaries of timing indexes, such as frame, subframe, slot, or symbol indexes, are locally defined in reference to the timing reference signal reception. A timing reference signal can be for example periodically transmitted paging signals. Once a timing reference signal is received from a reader and the A-IoT session is initiated, a UE may expect that the time interval between successive timing reference signals are fixed during the current A-IoT session for UEs to maintain a synchronization in a local manner, and the periodicity of the timing reference signal can be provided in the signal itself or via system information. When the current A-IoT session ends, the A-IoT UE may release synchronization and the local timing indexes, until the next A-IoT session starts by detecting a new timing reference signal.

From a network (e.g., the network 130) point of view, the timing reference signal may be transmitted in fixed predefined periodic occasions. For instance, the occasions may be SSB transmission occasions for other general UEs, or periodically configured reserved resources for other general UEs, etc. From a A-IoT device perspective, it may or may not be aware of predefined periodic occasions for reception timing of the timing reference signals as the A-IoT devices only keep track of synchronization and timing indexes in a local manner. Some A-IoT devices may be able to track the timing continuously and scan for a presence of timing reference signals at the predefined periodic occasions.

The A-IoT device receives a R2D signal or channel from the reader in a time slot indexed from the received timing reference signal 1720 or transmits a D2R signal or channel to the reader in a time slot indexed from the received timing reference signal 1730. As the R2D/D2R transmissions are locally synchronized, the R2D/D2R signals or channels may not be prefixed with a preamble signal for a presence detection. Alternatively, the R2D/D2R signals or channels may be still prefixed with a preamble signal to help detecting the signal.

The time/frequency resources used for A-IoT communication sessions may be indicated to other general NR UEs as reserved resources such that the other general NR UEs do not receive any periodic DL signals or channels, and do not transmit any periodic UL signals or channels. The general NR UEs may be provided from a serving cell a set of parameters related to frequency domain reserved resources and/or a set of parameters related to time domain reserved resources.

Figure 18:
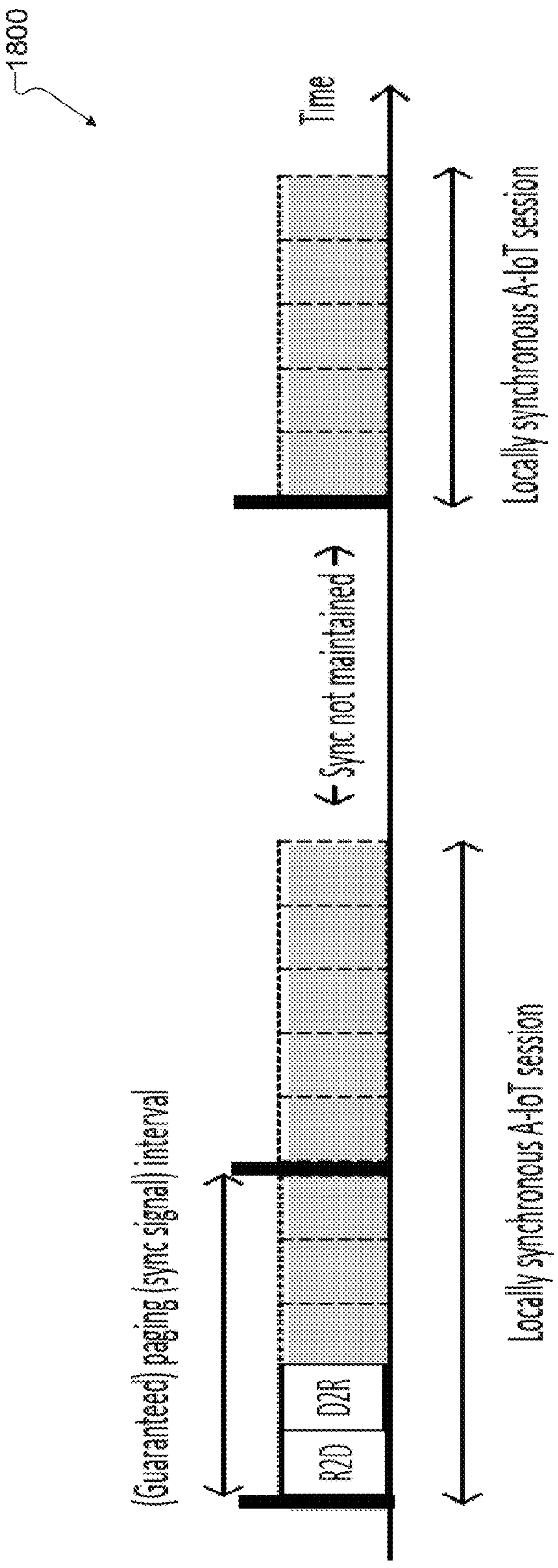
FIG. 18 illustrates a timeline for an example NW-triggered locally synchronous system according to embodiments of the present disclosure.

FIG. 18 illustrates a timeline 1800 for an example NW-triggered locally synchronous system according to embodiments of the present disclosure. For example, timeline 1800 can be followed by the IoT devices described herein. This example is for illustration only and other embodiments can be used without departing from the scope of the present disclosure.

The general principle for NW-triggered locally synchronous system includes a reader such as a BS (e.g., the BS 102) transmitting a timing reference signal providing a reference timing for deriving timing indexes, such as frame, subframe, slot, or symbol indexes, whose timing is relative to the timing reference signal reception timing, and a UE receiving a R2D signal/channel or transmitting a D2R signal/channel based on the derived timing indexes.

In this embodiment, the synchronization is maintained in a temporary manner when it is triggered by the network, wherein a reader triggers A-IoT communication session by transmitting a paging, which now also serves as a timing reference signal. The A-IoT devices drive timing indexes, such as slot or symbol indexes, from the paging, which are only valid during the current A-IoT communication session. Once the local synchronization is obtained, A-IoT devices can communicate with the reader in the same manner as in a synchronous system using timing indexes. Since the paging serves as a timing reference signal, the paging transmission interval needs to be fixed and guaranteed as long as the current A-IoT communication session is on-going. When the current A-IoT communication session ends, i.e., the paging is not received anymore, the A-IoT devices are not required to maintain the synchronization and releases the timing indexes. In some sense, the paging serves similar purpose as on-demand SSB.

With reference to FIG. 18, an example of a NW-triggered locally synchronous system according to the disclosure is shown. The reader initiates the A-IoT communication session by transmitting a paging. Once the paging is received from a reader, an A-IoT device expects that the transmission interval between the successive paging messages are fixed at least during the current A-IoT session, given that the paging messages serve as a timing reference signal. Taking into account the achievable SFO for A-IoT devices, there may be non-negligible clock drift between the two successive paging messages.

- The paging interval is determined such that the timing drift within a paging interval results less than ±X % of a slot duration.
- Provisioning of a guard time between slots taking into account the timing drift.
- Adding a preamble signal to R2D/D2R transmissions such that each signal provides their own timing information.

The paging interval and/or the guard time is provided to the UE in the paging message itself, in a system information or predefined in the specifications of the system operation. The interval/guard time may be in terms of absolute time, e.g., in ms, an integer multiple of certain time unit, such as basic time unit, symbol duration, or chip duration. When indicated, it can be indicated in its absolute value or as an index from a set of predefined value.

The attachment of preamble to R2D/D2R transmissions may be predefined in the specifications of the system operation or indicated to the UE, e.g., in a paging message or in a system information.

An A-IoT device may receive D2R scheduling information from the serving reader including the timing parameter for D2R transmission. The D2R transmission timing is referenced to the timing indexes, such as frame, subframe, slot, or symbol indexes. The timing, in its absolute value or as an index from a set of predefined values, may be indicated to the UE in the preceding R2D transmission.

Figure 19:
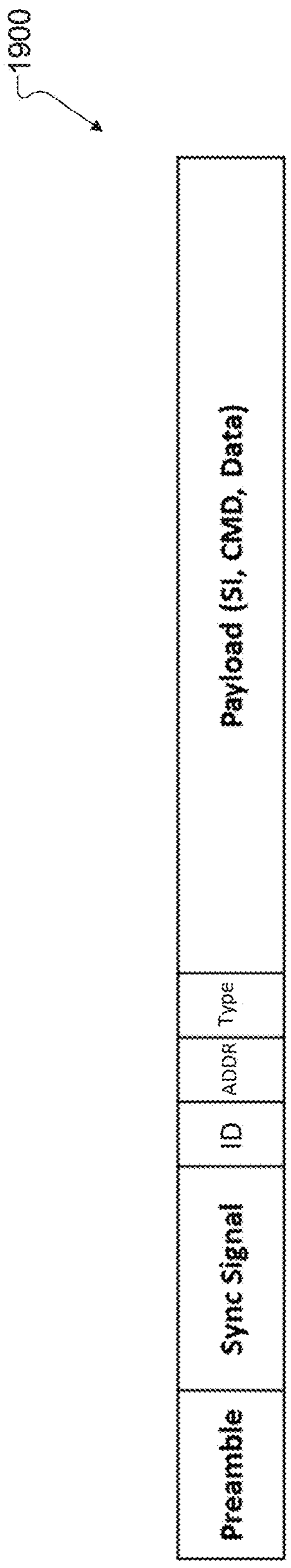
FIG. 19 illustrates a diagram of an example PRDCH/PDRCH signal architecture according to embodiments of the present disclosure.

FIG. 19 illustrates a diagram of an example PRDCH/PDRCH signal architecture 1900 according to embodiments of the present disclosure. For example, PRDCH/PDRCH signal architecture 1900 can be implemented by the reader and IoT devices disclosed herein. This example is for illustration only and other embodiments can be used without departing from the scope of the present disclosure.

With reference to FIG. 19, an example of a PRDCH/PDRCH signal structure according to the disclosure is shown. Depending on different types of signals or channels, only a subset of the fields in the figure may be included in a signal/channel.

- Preamble: The signal provides low complexity detection of the presence of the signal. This signal may only present in an asynchronous system only.
- Sync Signal: This signal provides timing synchronization. The signal may include one or more sequences of different lengths to provide different fineness of synchronization. In one example, the Preamble and Sync Signal are not a separate signal but a one signal, e.g., one OOK sequence providing symbol or chirp level synchronization as well as detection of the start-of-the signal. In another example, the Preamble and Sync Signal are two separate signals and the Sync Signal is provided only for device type 2b for time and frequency synchronization.
- ID: This field provides ID of the transmitter of the signal. For R2D, it may indicate PCI of the reader, if the reader is a BS. For D2R, it may indicate an associate UE ID of the A-IoT device.
- ADDR: This fields provides ID of the intended receiver of the signal. For D2R, it may indicate PCI of the reader, if the reader is a BS. For R2D, it may indicate a particular UE ID of an A-IoT device for a targeted communication. The field may indicate NULL, i.e., no ID is indicated, if it is a broadcast message, e.g., system information, or a blind inquiry message.
- TYPE: This field provides type of the corresponding signal. As an example, a type of signal can be system information, command, or R2D data.
- Payload: This field carries up to ~1000 bits, e.g., 210 bits. The payload is in accordance with the TYPE field indication. For instance, it can provide system information, type of command and parameters associated with an indicated command, e.g., D2R scheduling information, or R2D data.

A PRDCH/PDRCH signal or a channel may be prepended and/or appended with a specific sequence or pattern, e.g., delimiter, for start-of-signal and end-of-signal detections, respectively.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method for an ambient Internet of things (A-IoT) device to communicate with a reader, the method comprising:

- receiving a physical reader-to-device channel (PRDCH) from the reader, wherein:
  - the PRDCH is preceded by a first signal indicating start-of-signal and a second signal providing synchronization for receiving the PRDCH,
  - the PRDCH is followed by a third signal indicating end-of-signal, and
  - the PRDCH indicates a reader-to-device (R2D) message type of a corresponding R2D message carried in the PRDCH;
- determining a transmission timing of a physical device-to-reader channel (PDRCH) to the reader, wherein:
  - the PDRCH is preceded by a fourth signal providing synchronization for receiving the PDRCH, and
  - the transmission timing of the PDRCH is predefined from an end of the PRDCH; and
- transmitting the PDRCH to the reader at the determined transmission timing, wherein the PDRCH is transmitted by (i) backscattering an externally provided carrier wave (CW) or (ii) generating the CW internally.

2. The method of claim 1, wherein the PRDCH provides information to identify a target device by indicating:

- an identifier (ID) to select a specific device or a group of devices, or
- no ID to select all devices.

3. The method of claim 1, wherein the PRDCH carries an A-IoT paging message providing parameters related to perform random access.

4. The method of claim 1, wherein the PRDCH carries an access triggering message triggering transmission of the PDRCH via random access for device identification.

5. The method of claim 1, wherein the PDRCH is transmitted in a time slot from one or more consecutive time slots via time-division multiple access (TDMA).

6. The method of claim 1, wherein:
the PRDCH provides device-to-reader (D2R) scheduling information, and
transmitting the PDRCH to the reader at the determined transmission timing further comprises transmitting the PDRCH to the reader at the determined transmission timing and by applying the D2R scheduling information.

7. The method of claim 1, wherein the fourth signal providing synchronization for receiving the PDRCH is based on more than one sequence of different lengths providing different levels of synchronization accuracies.

8. A ambient Internet of things (A-IoT) device, comprising:
a transceiver configured to:
receive a physical reader-to-device channel (PRDCH) from a reader, wherein:
the PRDCH is preceded by a first signal indicating start-of-signal and a second signal providing synchronization for receiving the PRDCH,
the PRDCH is followed by a third signal indicating end-of-signal, and
the PRDCH indicates a reader-to-device (R2D) message type of a corresponding R2D message carried in the PRDCH; and
processing circuitry operably coupled to the transceiver, the processing circuitry configured to determine a transmission timing of a physical device-to-reader channel (PDRCH) to the reader, wherein:
the PDRCH is preceded by a fourth signal providing synchronization for receiving the PDRCH, and
the transmission timing of the PDRCH is predefined from an end of the PRDCH,
wherein the transceiver is further configured to transmit the PDRCH to the reader at the determined transmission timing,
wherein the PDRCH is transmitted by (i) backscattering an externally provided carrier wave (CW) or (ii) generating the CW internally.

9. The A-IoT device of claim 8, wherein the PRDCH provides information to identify a target device by indicating:
an identifier (ID) to select a specific device or a group of devices, or
no ID to select all devices.

10. The A-IoT device of claim 8, wherein the PRDCH carries an A-IoT paging message providing parameters related to perform random access.

11. The A-IoT device of claim 8, wherein the PRDCH carries an access triggering message triggering transmission of the PDRCH via random access for device identification.

12. The A-IoT device of claim 8, wherein the PDRCH is transmitted in a time slot from one or more consecutive time slots via time-division multiple access (TDMA).

13. The A-IoT device of claim 8, wherein:
the PRDCH provides device-to-reader (D2R) scheduling information, and
the transceiver is further configured to transmit the PDRCH to the reader at the determined transmission timing and by applying the D2R scheduling information.

14. The A-IoT device of claim 8, wherein the fourth signal providing synchronization for receiving the PDRCH is based on more than one sequence of different lengths providing different levels of synchronization accuracies.

15. A reader device, comprising:
a transceiver configured to:
transmit a physical reader-to-device channel (PRDCH) to an ambient Internet of things (A-IoT) device, wherein:
the PRDCH is preceded by a first signal indicating start-of-signal and a second signal providing synchronization for receiving the PRDCH,
the PRDCH is followed by a third signal indicating end-of-signal, and
the PRDCH indicates a reader-to-device (R2D) message type of a corresponding R2D message carried in the PRDCH; and
a processor operably coupled to the transceiver, the processor configured to determine a reception timing of a physical device-to-reader channel (PDRCH) from the A-IoT device, wherein:
the PDRCH is preceded by a fourth signal providing synchronization for receiving the PDRCH, and
the transmission timing of the PDRCH is predefined from an end of the PRDCH,
wherein the transceiver is further configured to receive the PDRCH from the A-IoT device at the determined reception timing.

16. The reader device of claim 15, wherein the PRDCH provides information to identify a target device by indicating:
an identifier (ID) to select a specific device or a group of devices, or
no ID to select all devices.

17. The reader device of claim 15, wherein the PRDCH carries an A-IoT paging message providing parameters related to perform random access.

18. The reader device of claim 15, wherein the PRDCH carries an access triggering message triggering transmission of the PDRCH via random access for device identification.

19. The reader device of claim 15, wherein the PDRCH is received in a time slot from one or more consecutive time slots via time-division multiple access (TDMA).

20. The reader device of claim 15, wherein:
the PRDCH provides device-to-reader (D2R) scheduling information, and
the transceiver is further configured to receive the PDRCH from the A-IoT device at the determined reception timing and by applying the D2R scheduling information.

* * * * *